(12) United States Patent
Kim et al.

(10) Patent No.: US 10,936,709 B2
(45) Date of Patent: Mar. 2, 2021

(54) ELECTRONIC DEVICE AND METHOD FOR CONTROLLING THE SAME

(71) Applicant: LG ELECTRONICS INC., Seoul (KR)

(72) Inventors: Kokeun Kim, Seoul (KR); Sooyoung Sim, Seoul (KR); Shinjae Kang, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 66 days.

(21) Appl. No.: 16/204,945

(22) Filed: Nov. 29, 2018

(65) Prior Publication Data

US 2019/0347391 A1    Nov. 14, 2019

(30) Foreign Application Priority Data

May 8, 2018    (KR) .......................... 10-2018-0052750
Aug. 6, 2018   (KR) .......................... 10-2018-0091460

(51) Int. Cl.
*G06F 21/32*    (2013.01)
*G06F 21/45*    (2013.01)

(52) U.S. Cl.
CPC .............. *G06F 21/32* (2013.01); *G06F 21/45* (2013.01)

(58) Field of Classification Search
CPC .................................. G06F 21/32; G06F 21/45
See application file for complete search history.

(56) References Cited

U.S. PATENT DOCUMENTS 7,505,613 B2 * 3/2009 Russo ................ G06K 9/00114
340/5.53
10,586,031 B2 * 3/2020 Andersson .............. G06F 21/32
(Continued)

FOREIGN PATENT DOCUMENTS

KR       10-1756059 B1       7/2017
KR    10-2018-0041016 A     4/2018

OTHER PUBLICATIONS

Wójtowicz et al., "Model for adaptable context-based biometric authentication for mobile devices," Pers Ubiquit Comput, vol. 19, No. 8, Dec. 2015, 15 pages.

*Primary Examiner* — Cheng-Feng Huang
(74) *Attorney, Agent, or Firm* — Birch, Stewart, Kolasch & Birch, LLP

(57) ABSTRACT

An electronic device according to an embodiment of the present disclosure may include a first biometric sensor configured to sense first biometric information; a second biometric sensor configured to sense second biometric information; a security module configured to set a multidimensional variable determination criterion including context information at the time of sensing at least one of the first biometric information and the second biometric information, and perform first user authentication by applying the multidimensional variable determination criterion to a matching score for the first biometric information or the second biometric information, and determine whether or not to perform second user authentication using the remaining biometric information based on a result of the first user authentication; and a controller configured to control an operation of the electronic device based on at least one of the first and second user authentication results carried out by the security module.

15 Claims, 15 Drawing Sheets

(56) References Cited

U.S. PATENT DOCUMENTS

| | | | | |
|---|---|---|---|---|
| 2009/0037978 | A1* | 2/2009 | Luque | G06K 9/00 |
| | | | | 726/2 |
| 2011/0138187 | A1* | 6/2011 | Kaga | G06F 21/32 |
| | | | | 713/186 |
| 2013/0227651 | A1* | 8/2013 | Schultz | H04L 63/0861 |
| | | | | 726/4 |
| 2014/0333415 | A1* | 11/2014 | Kursun | G06Q 30/00 |
| | | | | 340/5.83 |
| 2015/0347734 | A1* | 12/2015 | Beigi | H04L 9/3231 |
| | | | | 713/155 |
| 2016/0132735 | A1* | 5/2016 | Derakhshani | G06K 9/00 |
| | | | | 382/117 |
| 2019/0214022 | A1* | 7/2019 | Vaquero Aviles-Casco | |
| | | | | G10L 17/04 |

* cited by examiner

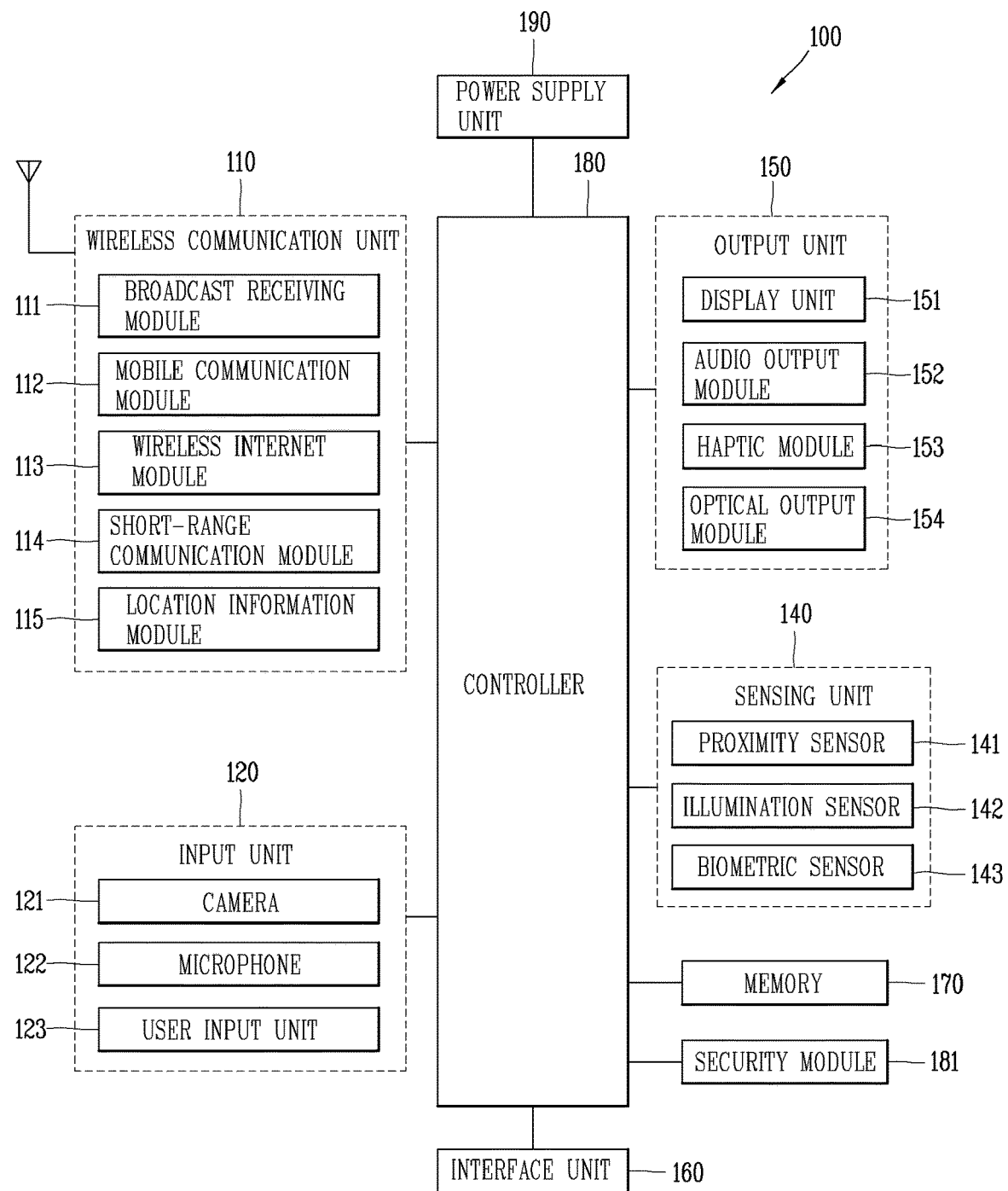
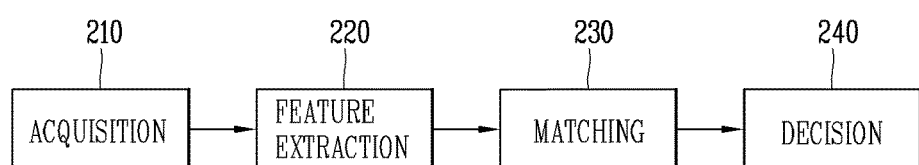

ELECTRONIC DEVICE AND METHOD FOR CONTROLLING THE SAME

CROSS-REFERENCE TO RELATED APPLICATIONS

This application claims priority under 35 U.S.C. § 119 to Korean Application No. 10-2018-0052750, filed on May 8, 2018, and No. 10-2018-0091460, filed on Aug. 6, 2018, whose entire disclosures are herein incorporated by reference.

FIELD

The present disclosure relates to an electronic device capable of performing multimodal biometric authentication.

BACKGROUND

With the development of technology, the functions of electronic devices are diversified. For example, the functions may include data and voice communication, photographing and video shooting through a camera, voice recording, playing a music file through a speaker system, and displaying an image or video on a display unit. Some electronic devices further include an electronic game play function or perform a multimedia player function. In particular, in recent years, electronic devices may receive multicast signals that provide visual content such as broadcast, video or television programs.

As it becomes multifunctional, an electronic device may be allowed to capture still images or moving images, play music or video files, play games, receive broadcast and the like, so as to be implemented as an integrated multimedia player.

In order to support and enhance the functions of the electronic device, the improvement of structural or software elements of the terminal may be taken into consideration.

As the functions of electronic devices are diversified, the importance of user authentication for security enhancement has increased. Various methods such as a password method, a pattern method, and a biometric method may be used for user authentication.

As a method of security authentication, biometrics is a technology that performs user authentication using unique physical characteristics such as a user's fingerprint, face, voice, iris, retina, blood vessels, or the like. Such biometrics technology is less susceptible to theft or imitation, and is highly usable.

In recent years, in order to enhance security, technological advances have been made from unimodal biometrics that performs biometric authentication using a single biometric information to multimodal biometrics that performs biometric authentication using a plurality of biometric information.

In implementing such multimodal biometric authentication technology, it is required to develop various methods that utilize a plurality of biometric information. In the present disclosure, a method of performing biometric authentication using a plurality of biometric information is proposed.

SUMMARY

An object of the present disclosure is to provide an electronic device capable of performing multimodal biometric authentication according to a determination criterion modified according to a context in consideration of various environmental factors at the time of performing multimodal biometric authentication, and a control method thereof.

Furthermore, another object of the present disclosure is to improve the authentication accuracy and usability of multimodal biometric authentication at the same time.

An electronic device according to an embodiment of the present disclosure, as an electronic device for performing multimodal biometric authentication, may include a first biometric sensor configured to sense first biometric information; a second biometric sensor configured to sense second biometric information; a security module configured to set a multidimensional variable determination criterion including context information at the time of sensing at least one of the first biometric information and the second biometric information, and perform first user authentication by applying the multidimensional variable determination criterion to a matching score for the first biometric information or the second biometric information, and determine whether or not to perform second user authentication using the remaining biometric information based on a result of the first user authentication; and a controller configured to control an operation of the electronic device based on at least one of the first and second user authentication results carried out by the security module.

Furthermore, according to an embodiment, the multidimensional variable determination criterion may be determined in consideration of biometric sensors for sensing biometric information, the context information, the matching score, and a fake relevance score of the biometric information as a whole.

Furthermore, according to an embodiment, the context information may include at least one of ambient illuminance, ambient noise, ambient temperature, characteristic information of biometric information, movement information, a posture of the electronic device, an execution of a preset application, a battery remaining amount of the electronic device, an input sequence of biometric information, and user information, and at least one of the context information may be selected based on the characteristics of biometric information.

Furthermore, according to an embodiment, the security module may calculate a matching score by comparing the first biometric information or the second biometric information with previously registered user information, and calculate a final score by combining the calculated matching score with a fake relevance score of the biometric information, and perform user authentication by applying a variable decision function generated on the basis of the context information and the fake relevance score of the biometric information to the calculated final matching score.

Furthermore, according to an embodiment, the fake relevance score of the biometric information may include at least one of an anti-spoofing score and a quality score, and the variable decision function may be generated by combining at least one of the anti-spoofing score and the quality score with the context information.

Furthermore, according to an embodiment, the variable decision function may be generated such that an upper threshold value and a lower threshold value related to the user authentication determination vary according to a level of the context information.

Furthermore, according to an embodiment, the upper threshold value may be a value at which a false acceptance rate (FAR) becomes zero, the lower threshold value may be a value at which a false rejection rate (FRR) becomes zero, and at least one of the upper threshold value and the lower threshold value may be increased or decreased according to a level of the context information.

Furthermore, according to an embodiment, the second user authentication may be carried out when the authentication result of the first user authentication does not correspond to both an authentication success and an authentication failure.

Furthermore, according to an embodiment, the no decision may be a case where a final score in consideration of the matching score, the fake relevance score of the biometric information, and the context information as a whole is less than the lower threshold value, and the lower threshold value may be varied according to the context information.

Furthermore, according to an embodiment, when performing the second user authentication, biometric information and context information for the second user authentication may be selected based on biometric information and context information used for the first user authentication.

Furthermore, according to an embodiment, when performing the second user authentication, both the first and second biometric information may be used, and a multidimensional variable determination criterion during the second user authentication may be determined by further considering a multidimensional variable determination criterion used for the first user authentication.

Furthermore, according to an embodiment, when performing the second user authentication, a multidimensional variable determination criterion during the second user authentication may be determined by further considering both a multidimensional variable determination criterion used for the first user authentication and context information used for the first user authentication.

An operation method of an electronic device according to an embodiment of the present disclosure, as an operation method of an electronic device that performs multimodal biometric authentication, may include sensing biometric information of at least one of a first biometric sensor and a second biometric sensor; setting a multidimensional variable determination criterion including context information at the time of sensing at least one of biometric information of the first and second biometric sensors; performing first user authentication by applying the multidimensional variable determination criterion to a matching score for the at least one biometric information; determining whether or not to perform second user authentication using the remaining biometric information based on a result of the first user authentication; and controlling an operation of the electronic device based on at least one of the first and second user authentication results.

Furthermore, according to an embodiment, said setting a multidimensional variable determination criterion may be setting in consideration of biometric sensors for sensing biometric information, the context information, the matching score, and a fake relevance score of the biometric information as a whole.

Furthermore, according to an embodiment, said performing first user authentication may include calculating a matching score by comparing the first biometric information or the second biometric information with previously registered user information; calculating a final score by combining the calculated matching score with a fake relevance score of biometric information; and performing the first user authentication by applying a variable decision function generated based on the context information and the fake relevance score of biometric information to the calculated final score.

Furthermore, according to an embodiment, the variable decision function may be generated such that an upper threshold value and a lower threshold value related to the user authentication determination vary according to a level of the context information, and the second user authentication may be carried out when the final score corresponds to between variable upper and a lower threshold values as a result of performing the first user authentication.

An electronic device according to the present disclosure may determine a variable determination criterion in consideration of a fake relevance score related to a surrounding environment at the time of performing biometric authentication and the characteristics of biometric authentication to perform biometric authentication, thereby improving all the usability, convenience and sensing accuracy of biometric authentication. In addition, whether or not to perform secondary authentication may be determined according to the execution result of primary authentication, thereby improving the authentication speed of biometric authentication. Furthermore, a multidimensional function in which a threshold value or a threshold range of no decision is varied each time may be applied to authentication in consideration of various context information collected while sensing biometric information and a fake relevance score as a whole, thereby improving the accuracy of biometric authentication during secondary authentication.

BRIEF DESCRIPTION OF THE DRAWINGS

The embodiments will be described in detail with reference to the following drawings in which like reference numerals refer to like elements wherein:

FIG. 1 is a block diagram for explaining an electronic device related to the present disclosure;

FIG. 2 is a conceptual view illustrating a single biometric authentication method;

DETAILED DESCRIPTION

Figure 3A:
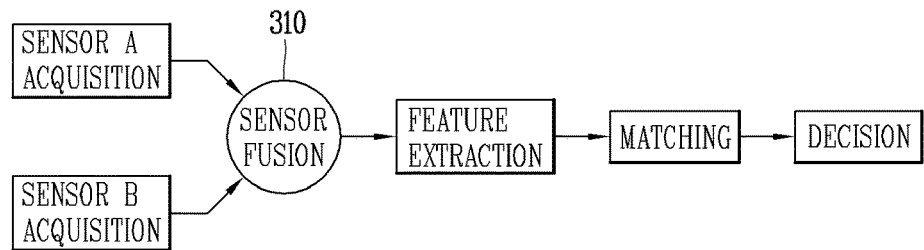
FIGS. 3A through 3D are conceptual views illustrating a multimodal biometric authentication method.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate an existence of several components or several steps, disclosed in the specification, and it may also be understood that part of the components or steps may not be included or additional components or steps may further be included.

Portable electronic devices described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), smart vehicles and the like.

However, it may be easily understood by those skilled in the art that the configuration according to the exemplary embodiments of this specification can also be applied to stationary terminals such as digital TV, desktop computers and the like, excluding a case of being applicable only to the electronic devices.

FIG. 1 is a block diagram for explaining an electronic device related to the present disclosure.

Referring to FIG. 1, the electronic device may include an input unit 120, a sensing unit 140, an output unit 150, an interface unit 160, a memory 170, a controller 180, a security module 181, and a power supply unit 190, and the like. The components shown in FIG. 1 are not essential for implementing an electronic device, and thus the electronic device described herein may have more or fewer components than those listed above.

In more detail, the wireless communication unit 110 of those components may typically include one or more modules which permit wireless communications between the electronic device 100 and a wireless communication system, between the electronic device 100 and another electronic device 100, or between the electronic device 100 and an external server. In addition, the wireless communication unit 110 may include one or more modules for connecting the electronic device 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of information within the electronic device, surrounding environment information of the electronic device, and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The biometric sensor 143 may include an iris sensor, a face recognition sensor, a PPG sensor, a voice sensor, and the like. On the other hand, the electronic device 100 disclosed herein may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the electronic device 100 and a user, as well as functioning as the user input unit 123 which provides an input interface between the electronic device 100 and the user.

The interface unit 160 may serve as an interface with various types of external devices connected with the electronic device 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The electronic device 100 may execute an appropriate control associated with a connected external device, in response to the external device being connected to the interface unit 160.

In addition, the memory 170 stores data that support various functions of the electronic device 100. The memory 170 is typically implemented to store data to support various functions or features of the electronic device 100. For instance, the memory 170 may be configured to store application programs executed in the electronic device 100, data or instructions for operations of the electronic device 100, and the like. At least some of those application programs may be downloaded from an external server via wireless communication. Some others of those application programs may be installed within the electronic device 100 at the time of being shipped for basic functions of the electronic device 100 (for example, receiving a call, placing a call, receiving a message, sending a message, etc.). On the other hand, the application programs may be stored in the memory 170, installed in the electronic device 100, and executed by the controller 180 to perform an operation (or a function) of the electronic device 100.

The controller 180 may typically control an overall operation of the electronic device 100 in addition to the operations associated with the application programs. The controller 180 may provide or process information or functions appropriate for a user by processing signals, data, information and the like, which are input or output by the various components depicted in FIG. 1A, or activating application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the electronic device 100 for operation.

The power supply unit 190 may receive external power or internal power and supply appropriate power required for operating respective elements and components included in the electronic device 100 under the control of the controller 180. The power supply unit 190 may include a battery, and the battery may be an embedded battery or a replaceable battery.

At least part of those elements and components may be combined to implement operation and control of the terminal or a control method of the electronic device according to various exemplary embodiments described herein. Furthermore, the operation and control or the control method of the portable electronic device may be implemented in the portable electronic device in such a manner of activating at least one application program stored in the memory 170.

Hereinafter, each aforementioned component will be described in more detail with reference to FIG. 1A, prior to explaining various exemplary embodiments implemented by the electronic device 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 means a module for supporting wireless Internet access. The wireless Internet module 113 may be built-in or externally installed to the electronic device 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the electronic device 100 and a wireless communication system, between the electronic device 100 and another electronic device 100, or between the electronic device and a network where another electronic device (or an external server) is located, via wireless personal area networks. The short-range communication module 114 denotes a module for short-range communications.

In some embodiments, another electronic device (which may be configured similarly to electronic device 100) may be a wearable device, for example, a smart watch, a smart glass or a head mounted display (HMD), which is able to exchange data with the electronic device 100 (or otherwise cooperate with the electronic device 100). The short-range communication module 114 may sense (recognize) a wearable device, which is able to communicate with the electronic device 100, near the electronic device 100. In addition, when the sensed wearable device is a device which is authenticated to communicate with the electronic device 100 according to the present disclosure, the controller 180 may transmit at least part of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

The location information module 115 is generally configured to detect, calculate, derive or otherwise identify a position of the electronic device. As an example, the location information module 115 includes a Global Position System (GPS) module, a WiFi module, or both. For example, when the electronic device uses the GPS module, a position of the electronic device may be acquired using a signal sent from a GPS satellite. As another example, when the electronic device uses the Wi-Fi module, a position of the electronic device may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the electronic device. As a module used to acquire the location (or current location) of the electronic device, the location information module 115 may not be necessarily limited to a module for directly calculating or acquiring the location of the electronic device.

The input unit 120 may be configured to provide an audio or video signal (or information) input to the electronic device or information input by a user to the electronic device. For the input of the audio information, the electronic device 100 may include one or a plurality of cameras 121. The camera 121 processes a image frame, such as still picture or video, acquired by an image sensor in a video phone call or image capturing mode. The processed image frames may be displayed on the display unit 151. On the other hand, the plurality of cameras 121 disposed in the electronic device 100 may be arranged in a matrix configuration. By use of the cameras 121 having the matrix configuration, a plurality of image information having various angles or focal points may be input into the electronic device 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the electronic device 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the electronic device 100 to correspond to the input information. The user input unit 123 may include a mechanical input element (or a mechanical key, for example, a button, a dome switch, a jog wheel, a jog switch or the like located on a front/rear surface or a side surface of the electronic device 100), and a touch-sensitive input element. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the electronic device, surrounding environment information of the electronic device and user information, and generate a sensing signal corresponding thereto. The controller 180 may control an operation of the electronic device 100 or execute data processing, a function or an operation associated with an application program installed in the electronic device 100 based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the electronic device 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the electronic device 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may display (output) information processed in the electronic device 100. For example, the display unit 151 may display execution screen information of an application program driven in the electronic device 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the electronic device 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. The haptic module 153 may be implemented in two or more in number according to the configuration of the electronic device 100.

An optical output module 154 may output a signal for indicating an event generation using the light of a light source of the electronic device 100. Examples of events generated in the electronic device 100 may include a message reception, a call signal reception, a missed call, an alarm, a schedule notice, an email reception, an information reception through an application, and the like.

A signal output by the optical output module 154 may be implemented in such a manner that the electronic device emits monochromatic light or light with a plurality of colors. The signal output may be terminated as the electronic device senses a user's event checking.

The interface unit 160 serves as an interface for external devices to be connected with the electronic device 100. For example, the interface unit 160 can receive data transmitted from an external device, receive power to transfer to elements and components within the electronic device 100, or transmit internal data of the electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the electronic device 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the electronic device 100 via the interface unit 160.

Also, the interface unit 160 may serve as a path for power to be supplied from an external cradle to the electronic device 100 when the electronic device 100 is connected to the external cradle or as a path for transferring various command signals inputted from the cradle by a user to the electronic device 100. Such various command signals or power inputted from the cradle may operate as signals for recognizing that the electronic device 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the electronic device 100 may operate a web storage which performs the storage function of the memory 170 on the Internet.

As aforementioned, the controller 180 may typically control the general operations of the electronic device 100. For example, the controller 180 may set or release a lock state for restricting a user from inputting a control command with respect to applications when a state of the electronic device meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the electronic device 100.

The security module 181 controls an operation related security among the operations of the electronic device. For example, when a biometric authentication function is executed, the security module 181 may perform control related to biometric authentication. For example, the security module 181 may perform biometric authentication using an artificial neural network algorithm or an SVM algorithm, which is an algorithm for biometric authentication. In addition, the security module 181 may perform an algorithmic operation, such as Fuzzy logic, Dempster-Shafer theory, SVM, relevance vector machine (RVM) mean rule, Monte Carlo approach, phase stretch transform (PST), neural network, principal component analysis, Fisherfaces, Wavelet and Elastic Matching, or the like, which is an algorithm for biometric authentication.

The security module 181 may communicate with the controller 180 to transmit and receive data, thereby controlling an overall operation of the electronic device. For example, the controller 180 may receive user authentication result data from the security module 181 and control an operation of the electronic device based on the received data. In addition, the security module 181 may receive a control command for performing biometric authentication from the controller 180, thereby performing biometric authentication.

On the other hand, in FIG. 1, the security module 181 and the controller 180 are illustrated as being separate components, but the present disclosure is not limited thereto, and the security module 181 may be configured as one component of the controller 180.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Hereinafter, a method of performing biometric authentication in the electronic device described in FIG. 1 will be described in detail. FIG. 2 is a conceptual view illustrating a single biometric authentication method.

Referring to FIG. 2, single biometric authentication may include the steps of acquisition 210, feature extraction 220, matching 230 and decision 240.

In the acquisition step 210, biometric information may be acquired through a biometric sensor. The biometric information may include a user's own biometric information such as fingerprint, face, voice, vein, iris, and the like.

In the feature extraction step 220, the features of the biometric information may be extracted. The feature is information capable of recognizing the unique characteristic of each person. For example, in the case of a fingerprint, a point representing a specific shape of the fingerprint may be set as a feature. These features are set differently for each biometric authentication method.

In the matching step 230, a matching score between previously registered user information and sensed biometric information may be calculated. The previously registered user information is biometric information stored in advance by a user prior to performing biometric authentication. The user store fingerprint information, face information, voice information, vein information, iris information, and the like in advance in the memory 170 in a templet shape.

The matching score indicates a similarity between the previously registered user information and the biometric information. Various algorithms previously known in the related art may be used as an algorithm for calculating matching scores.

In the decision step 240, user authentication may be carried out using the matching score and the decision function. The decision function is a function that determines whether a user who enters biometric information is a genuine user or an impostor user. The decision function may be set to a specific threshold value, or may be set to a multi-dimensional function.

The decision function may be set to an initial setting value (default) by a manufacturer of a biometric authentication function. Furthermore, the decision function may change the initial setting value using the user's biometric information sensed through the biometric sensor. Accordingly, the electronic device may improve the speed and accuracy of biometric recognition as a lot of biometric operations are carried out.

In addition, the decision function may be generated differently according to information used to generate the decision function. Moreover, the differently generated decision function may be stored in the memory 170 in a plurality of ways. For example, the decision function may be generated with only a matching score, or may be generated using a matching score and a spoofing score. In this case, both of the decision functions may be stored in the memory 170, and biometric authentication may be carried out using any one of the decision functions as needed.

A single biometric authentication method has been described above. Hereinafter, a multimodal biometric authentication method will be described. FIGS. 3A through 3D are conceptual views illustrating a multimodal biometric authentication method.

Multimodal biometric authentication may be divided into four types according to the time of fusioning a plurality of biometric information. Here, fusion refers to an operation of combining a plurality of information according to a preset algorithm to generate one information, and may be used in terms of coupling, combination, fusion, and matching.

FIG. 3A has shown a sensor fusion method 310. The sensor fusion method 310 is a method of combining a plurality of biometric information acquired from different sensors in the step of acquiring biometric information. Specifically, the sensor fusion method is a method of fusioning biometric information sensed by different biometric sensors and extracting features from the fusioned information.

Figure 3B:
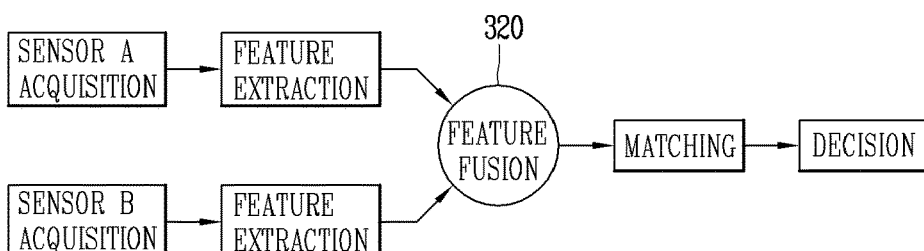

FIG. 3B has shown a feature fusion method 320. The feature fusion method 320. The feature fusion method 320 of respectively extracting feature from a plurality of biometric information acquired from different biometric sensors in the step of extracting the features of biometric information, and combining the respectively extracted features.

Figure 3C:
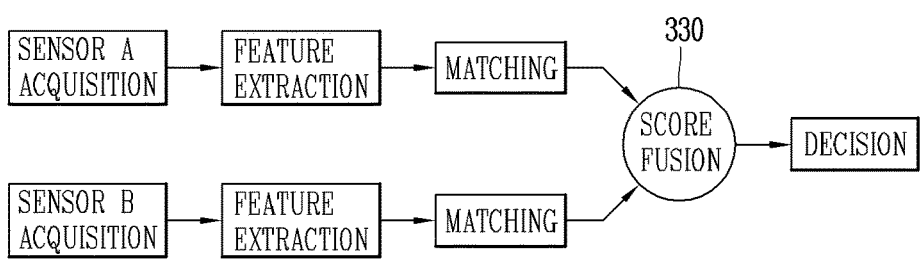

FIG. 3C has shown a score fusion method 330. The score fusion method 330 is a method of combining matching scores calculated for each of the plurality of biometric information in the step of matching biometric information.

Figure 3D:
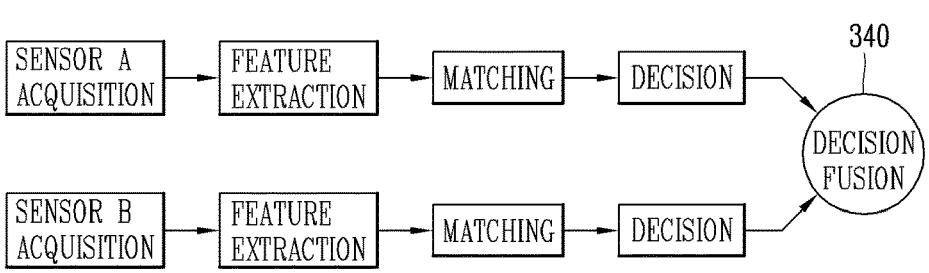

FIG. 3D has shown a decision fusion method 340. The decision fusion method 340 is a method of combining decision results calculated for each of the plurality of biometric information in the step of determining biometric information.

Figure 4A:
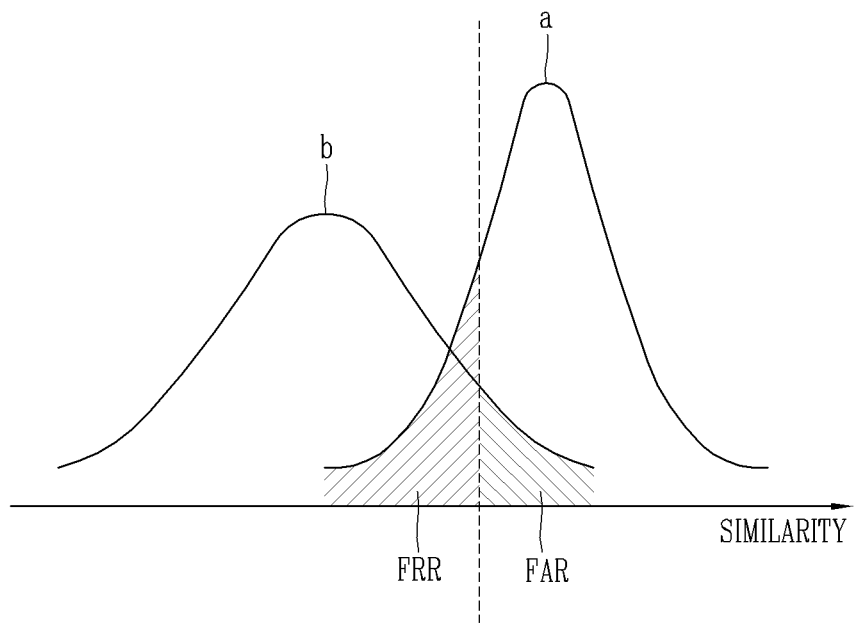
FIGS. 4A and 4B are graphs related to an error rate of a biometric authentication determination.
Figure 4B:
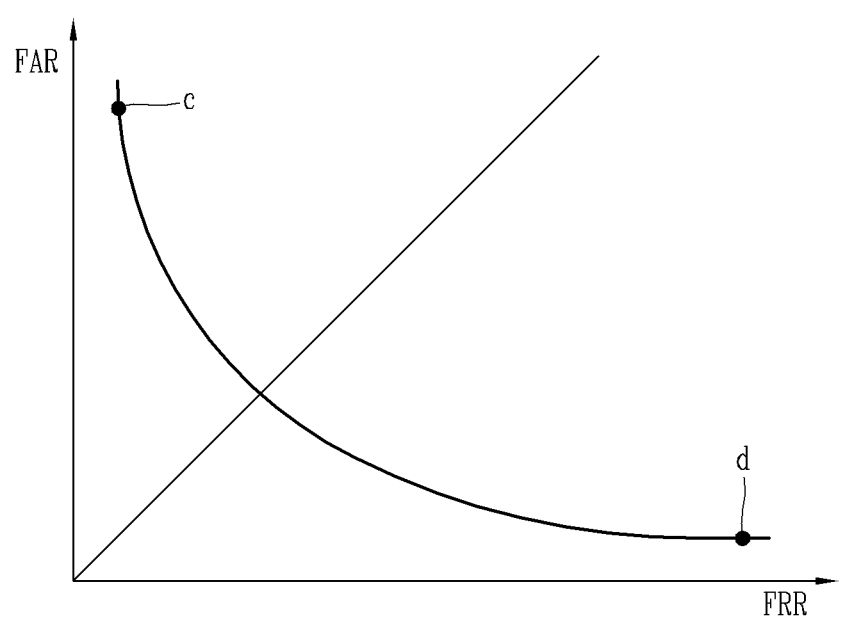

Various methods of multimodal biometric authentication have been described above. Hereinafter, an error rate of biometrics related to a decision function will be described in the case of user authentication through biometric authentication. FIGS. 4A and 4B are graphs related to an error rate of a biometric authentication determination.

Graph "a" in FIG. 4A is a graph showing a similarity distribution between the biometric information of a genuine user and the previously registered user information at the time of biometric authentication, and graph "b" in FIG. 4A is a graph showing a similarity distribution between the biometric information of an impostor user and the previously registered user information.

The graphs "a" and "b" have overlapping portions, and the electronic device 100 determines a user as a genuine user when having a similarity higher than a threshold value indicated by dotted line aa', and determines the user as an impostor user when having a similarity lower than the threshold value. Here, the threshold value may be a value determined by a provider providing a biometric authentication function, and denotes the above-described decision function.

On the other hand, a false rejection rate (FRR) illustrated in FIG. 4A indicates a rate determined to be an impostor user although the user is a genuine user. Since the higher the FRR is, the higher the threshold value, and thus a probability that the user who has entered biometric information is determined as a genuine user is decreased, the security of the biometric authentication may be enhanced. Since the lower the FRR is, the lower the threshold value, and thus a probability that the user who has entered biometric information is determined as a genuine user is increased, the security of the biometric authentication may be reduced.

A false acceptance rate (FAR) indicates an error rate determined to be a genuine user although the user is a genuine user. FAR is a concept contrary to FRR, and since the higher the FAR is, the lower the threshold value, and thus a probability that the user who has entered biometric information is determined as a genuine user is increased, the security of the biometric authentication may be reduced.

FIG. 4B is a graph showing a relationship between a FRR and a FAR. The FRR and the FAR may be inversely proportional to each other. A threshold value corresponding to region d having a high FRR and a low FAR may be used for applications requiring high security although having a low authentication speed. For example, a threshold value for this area may be set in a billing application, a banking application, which strictly determines a genuine user. On the contrary, a threshold value corresponding region c having a low FRR and a high FAR may be used for applications requiring low security although having a high authentication speed. For example, a threshold value corresponding to this region may be used for an unlock function or the like. The threshold value (i.e., decision function) of the biometric authentication function may be determined in consideration of a security level of functions to be executed through biometric authentication. Parameters related to an error at the time of biometric authentication have been described above.

Hereinafter, an algorithm that can be used in a score fusion method among multimodal biometric authentication methods will be described.

In the score fusion method, a variety of artificial intelligence algorithms that combine match scores may be used. A combination-based score fusion algorithm, a classifier-based score fusion algorithm, and a density-based score fusion algorithm may be used in an algorithm that can be used in the score fusion method.

The combination-based score fusion algorithm may include statistical rules, dynamic weighting, triangular norms, and the like. The classifier-based score fusion algorithm may include support vector machine (SVM), AdaBoost (RS-ADA), and Dampster-Shafer (DS). The density-based score fusion algorithm may include a likelihood feature (LF).

In addition, various algorithms and the like known in a score fusion method may be used in the present disclosure, and the detailed description thereof will be omitted in order not to depart from the spirit of the present disclosure.

Hereinafter, biometric authentication in a serial manner in which two or more different biometric authentication methods are sequentially performed to perform biometric authentication will be described with reference to the drawings.

Figure 5:
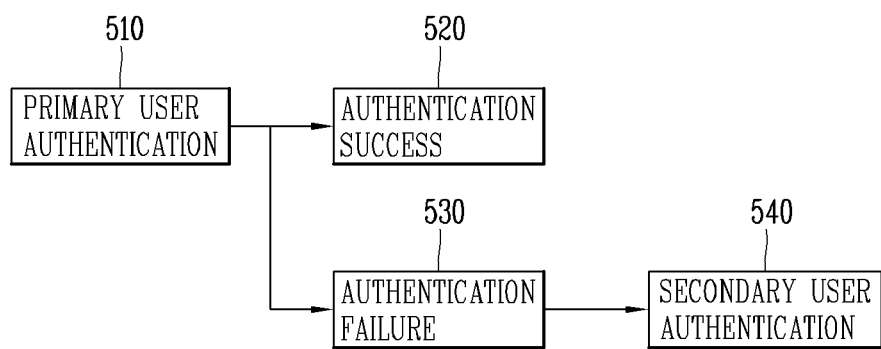
FIG. 5 is a conceptual view showing a method of performing serial biometric authentication during multimodal biometric authentication in the related art.

FIG. 5 is a conceptual view illustrating a method of performing biometric authentication in a serial manner during multimodal biometric authentication in the related art.

Biometric authentication may be classified according to biometric information. For example, the biometric authentication may include face authentication, fingerprint authentication, voice authentication, iris authentication, vein authentication, and the like, and a user may perform biometric authentication using a variety of human body information capable of exhibiting a person's unique characteristics.

The multimodal biometric authentication is a method of performing biometric authentication using different biometric information.

The method of multimodal biometric authentication may include serial biometric authentication and parallel biometric authentication according to the time of acquisition of biometric information. Specifically, the serial method is a method of sequentially acquiring a plurality of biometric information, and the parallel method is a method of acquiring a plurality of biometric information at the same time and fusing the acquired biometric information at the same time to perform biometric authentication The serial method is advantageous in that a period of time required for biometric authentication is short because one method of biometric authentication is carried out at a time, and has good usability. However, the serial method has a lower accuracy compared to the parallel method.

According to the present disclosure, a method of performing biometric authentication using a serial method will be described. Hereinafter, a serial method in the related art will be described in more detail with reference to the drawings.

Referring to FIG. 5, serial biometric authentication acquires one biometric information to perform biometric authentication (primary user authentication, 510). For a result of performing the primary user authentication 510, there are an authentication success 520 in which previously registered user information and acquired biometric information match each other or an authentication failure 530 in which previously registered user information and acquired biometric information do not match each other. In the case of the authentication failure 530, serial biometric authentication acquires another biometric information to perform additional authentication (secondary user authentication, 540).

In other words, the serial biometric authentication sequentially recognizes and authenticates different biometric information according to a preset order. Such a serial biometric authentication may also be referred to as sequential authentication, cascaded authentication, or multi-stage fusion authentication.

For the serial biometric authentication, optimization of thresholds based on linear model, a symmetric rejection method, a marcialis's method, a SPRT-based method, serial fusion based semi-supervised learning techniques, a quality-based adaptive context switching algorithm, or the like, may be used.

Figure 6:
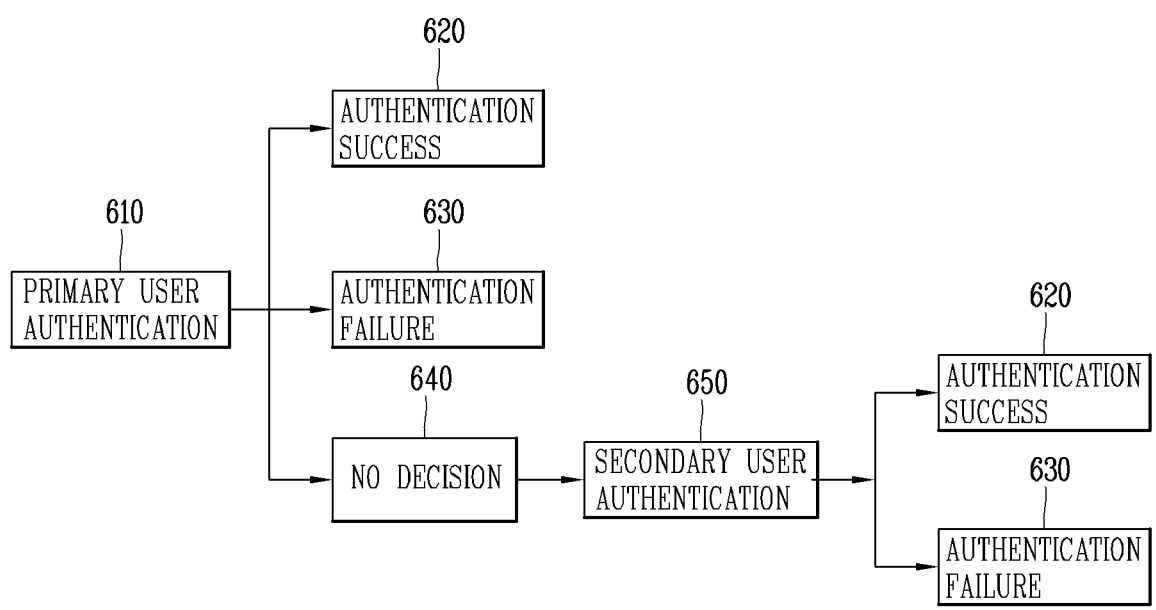
FIGS. 6 and 7 are conceptual views showing a method of performing serial biometric authentication.
Figure 7:
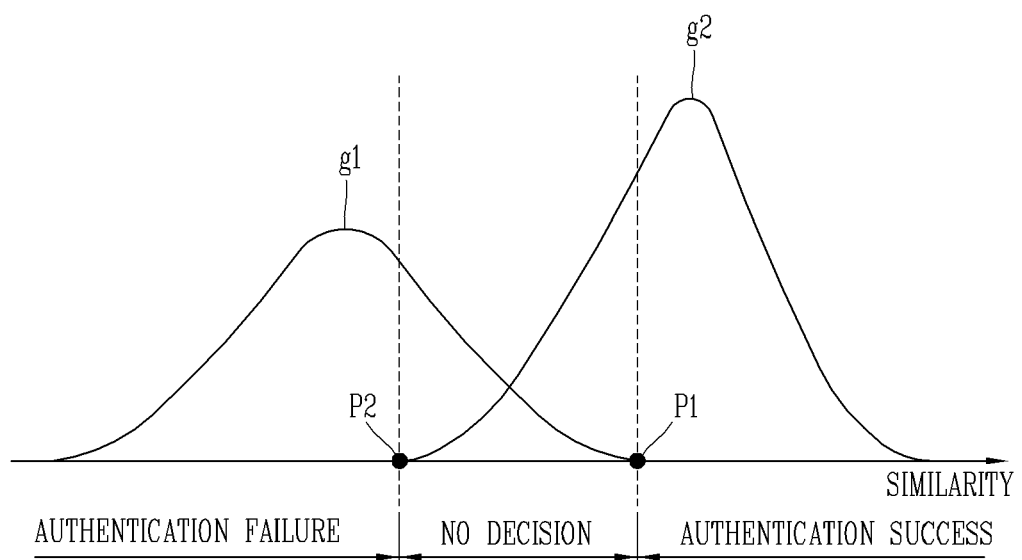

Hereinafter, serial multimodal biometric authentication will be described in more detail. FIGS. 6 and 7 are conceptual views showing a specific method of performing serial biometric authentication.

Referring to FIG. 6, the serial biometric authentication is divided into a primary user authentication 610 and a secondary user authentication 650. The primary user authentication 610 and the secondary user authentication 650 are biometric authentication methods using different biometric information. For example, the primary user authentication 610 may be fingerprint recognition, and the secondary user authentication 650 may be face recognition.

The execution result of the primary user authentication 610 is divided into an authentication success 620, an authentication failure 630, and no decision 640.

Specifically, when a degree of similarity between previously registered user information and acquired biometric information is greater than (or equal to) a first reference value (P1 in FIG. 7), the security module 181, which processes biometric information, determines that it is an authentication success 620.

The first reference value (P1) is a value at which the false acceptance rate (FAR) becomes zero. Here, the false acceptance rate (FAR) is a rate at which an impostor user is mistaken as a genuine user. The value at which the FAR becomes zero may be referred to as a threshold value at which an impostor user is not mistaken as a genuine user. Accordingly, if the similarity degree is a first reference value, that is, a value at which the FAR is greater than zero (or equal to or greater than zero), it will be determined as an authentication success 620.

Furthermore, when a degree of similarity between previously registered user information and acquired biometric information is less than (or equal to) a second reference value (P2 in FIG. 7), the security module 181 determines that it is an authentication failure 630.

The second reference value (P2) is a value at which the false rejection rate (FRR) becomes zero. Here, the false rejection rate (FRR) is at rate at which a genuine user is mistaken as an impostor user. The value at which the FRR becomes zero may be referred to as a threshold value at which a genuine user is not mistaken as an impostor user. Accordingly, if the similarity degree is a second reference value, that is, a value at which the FAR is less than zero (or equal to or less than zero), it will be determined as an authentication failure 630.

The security module 181 may perform an authentication initialization operation in the case of the authentication failure 630. The authentication initialization operation denotes an operation of switching to a standby state capable of performing the primary user authentication again.

Furthermore, when a degree of similarity between previously registered user information and acquired biometric information is greater than or equal to a second reference value (P2) but less than or equal to a first reference value (P1), the security module 181 determines that it is no decision 640. In this case, the security module 181 performs the secondary user authentication 650. In other words, the secondary user authentication 650 may be carried out when it is no decision during serial multimodal biometric authentication.

During the serial biometric authentication, the secondary user authentication 650 may perform biometric authentication using biometric information acquired from the primary user authentication and newly acquired biometric information. At this time, the newly acquired biometric information is biometric information different from the biometric information acquired from the primary user authentication. For example, in the case where fingerprint recognition information is acquired from the primary user authentication, face recognition information may be acquired from the secondary user authentication.

The secondary user authentication 650 may perform biometric authentication using any one of fusion methods described above with reference to FIGS. 3A through 3D.

For example, the secondary user authentication may perform user authentication by combining a comparison result acquired by comparing the previously registered user information with first biometric information, which is carried out at the time of the primary user authentication, with a comparison result acquired by comparing secondary biometric information with the previously registered user information by a preset algorithm. Accordingly, the secondary user authentication 650 may have a higher accuracy than the primary user authentication 610.

The security module 181 determines that the execution result of the secondary user authentication 650 is either one of an authentication success or an authentication failure. Then, the secondary user authentication 650 may end the user authentication.

On the other hand, the security module 181 may perform an authentication initialization operation when the execution of the secondary user authentication 650 is completed. Accordingly, the user may retry the primary user authentication again.

On the other hand, during the foregoing serial biometric authentication, user authentication is sequentially carried out according to a sequence determined based on a preset sequence or a specified criterion. At this time, obtainable biometric information varies according to a surrounding environment at the time of performing biometric authentication, a user's context, and an operating state of the electronic device. At this time, the sensing accuracy of biometric information varies according to a surrounding environment at the time of performing biometric authentication, a user's context, and an operating state of the electronic device. However, in the related art, multimodal biometric authentication has been carried out without considering such a context.

Furthermore, during the serial biometric authentication, subsequent biometric authentication is carried out in accordance with a result of preceding biometric authentication. At this time, the subsequent biometric authentication may be carried out when the result of the preceding biometric authentication is no decision.

At this time, although the result of the preceding biometric authentication should be determined as no decision, it may be determined as an authentication failure according to the influence of a surrounding environment at the time of performing biometric authentication and the like. Therefore, when a possibility in which the preceding biometric authentication is determined as no decision increases due to the emphasis on a surrounding environment, the sensing accuracy of the preceding biometric authentication decreases. On the contrary, when the sensing accuracy of the preceding biometric authentication is emphasized, a possibility in which the preceding biometric authentication is determined as an authentication failure increases, and thus the subsequent biometric authentication itself is not carried out. As a result, the usability of the multimodal biometric authentication deteriorates.

Therefore, the present disclosure determines a variable criterion according to a surrounding environment or the like at the time of performing biometric authentication during serial biometric authentication, thereby implementing a method of improving both the usability and the sensing accuracy of the multimodal biometric authentication.

On the other hand, hereinafter, the preceding biometric authentication is referred to as "primary user authentication" or "first user authentication." Furthermore, the subsequent biometric authentication is referred to as "secondary user authentication" or "second user authentication." In addition, in the present disclosure, multimodal biometric authentication in a serial manner has been described as an example, but the present disclosure is not limited thereto.

For example, the present disclosure may be applicable to modified serial biometric authentication in which secondary user authentication is sequentially carried out even when the result of primary user authentication is an authentication success according to a degree of security. Moreover, the present disclosure may also be applicable to parallel biometric authentication to the extent that does not contradict.

Figure 8A:
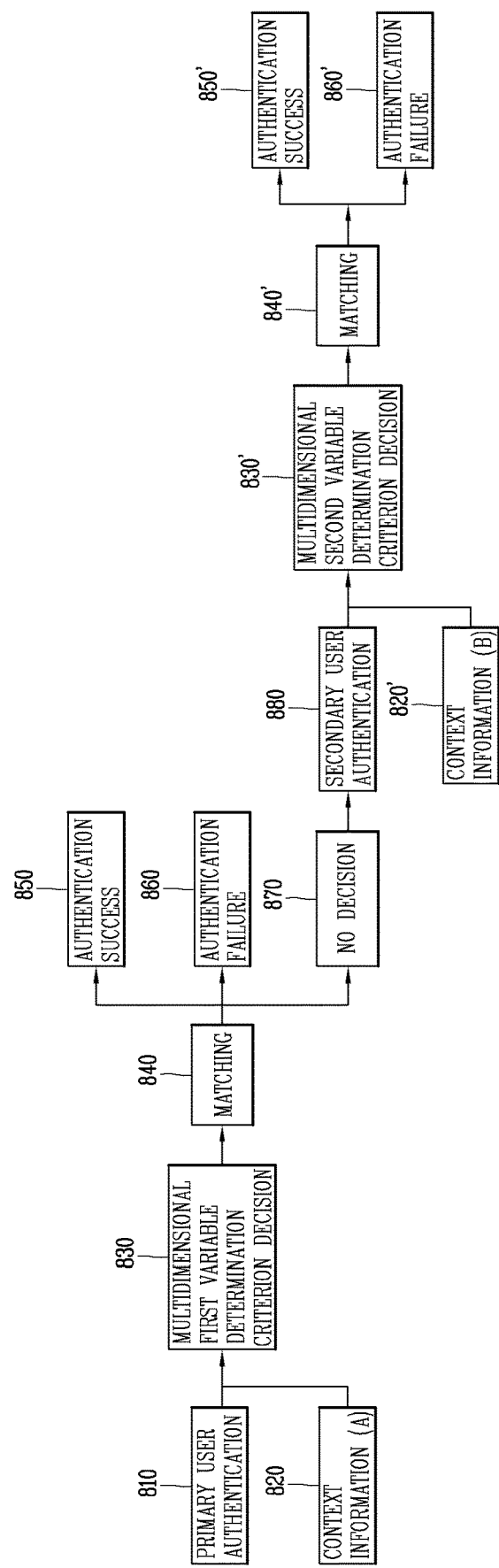
FIGS. 8A through 8C are exemplary views for explaining a method of applying a variable determination criterion according to a context to perform serial biometric authentication during multimodal biometric authentication according to the present disclosure.
Figure 8B:
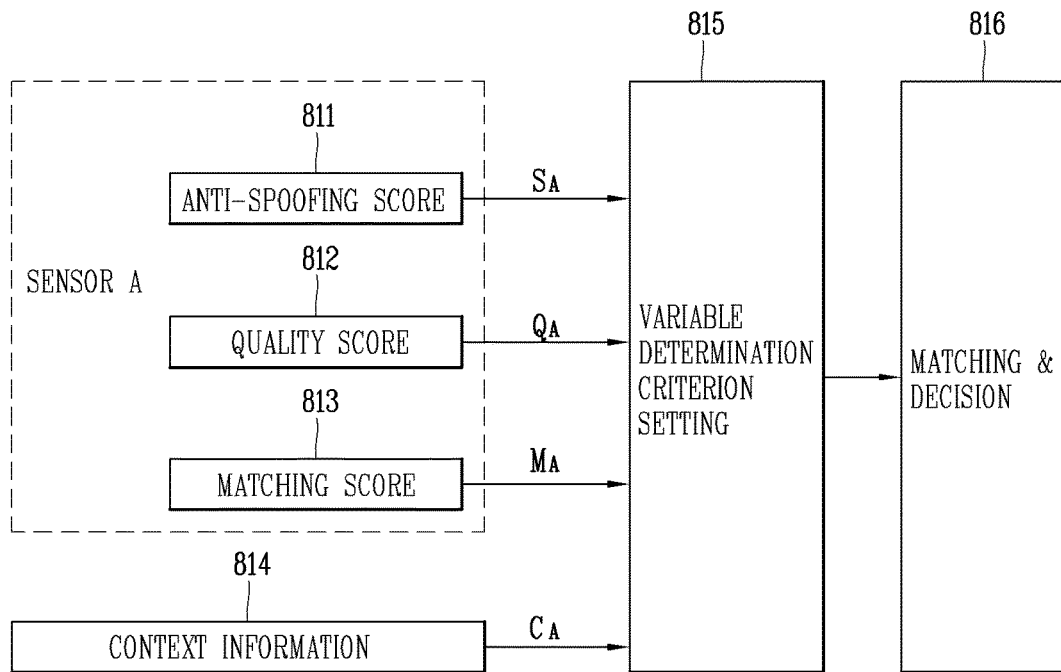
Figure 8C:
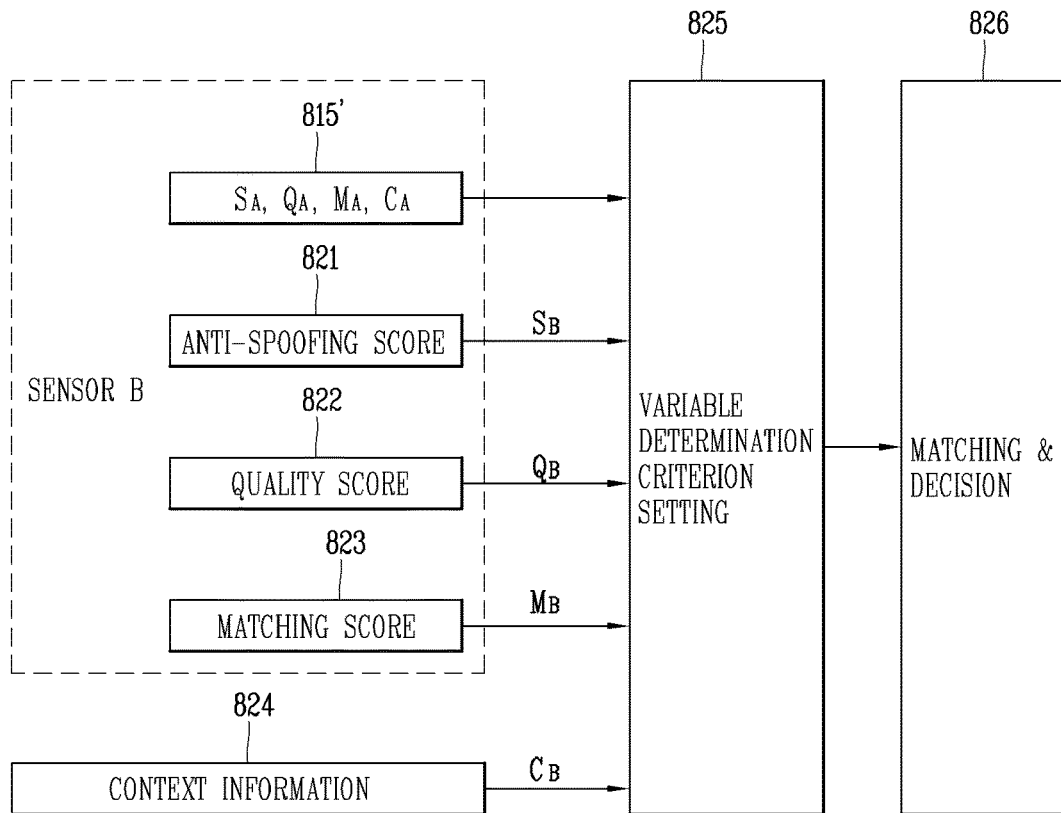

FIGS. 8A through 8C illustrate a method of applying a variable determination criterion according to a context to perform serial biometric authentication during multimodal biometric authentication according to the present disclosure.

Referring to FIG. 8A, the security module 181 of the electronic device 100 according to the present disclosure activates a biometric authentication function for executing primary user authentication 810 when an execution command for a function that requires multimodal biometric authentication is applied. For example, the security module 181 may execute a related program in the background of the electronic device 100 to execute a biometric authentication function in real time or at predetermined intervals.

The security module 181 of the electronic device 100 may sense context information (A) 820 at the time of or prior to sensing biometric information for primary user authentication 810.

Here, the context information (A) 820 may include surrounding environment information, operational state information of the electronic device, and user related information.

More specifically, the context information may include surrounding environment information such as ambient illuminance, ambient noise, ambient temperature, characteristic information of biometric information, movement information, and the like. Furthermore, the context information may include operational state information of the electronic device 100 such as a posture of the electronic device 100, shake information, whether or not to execute a preset application, a security level of the executed application, a battery remaining amount of the electronic device 100, and the like. In addition, the context information may include user related information such as input information such as an input sequence of biometric information, user information, and the like.

Besides, various environmental sensors (e.g., an illuminance sensor, a temperature sensor, etc.), a gyro sensor, a geomagnetic sensor, and the like provided in the electronic device 100 may be activated for the collection of the context information. Moreover, for the collection of the context information, information stored in the memory 170 of the electronic device 100 may be used.

In one embodiment, two or more pieces of the context information may be selected based on the characteristics of biometric information. Alternatively, context information indicating a context related to biometric authentication of the electronic device 100 may be collected. Alternatively, the context information (A) 820 may be an element that determines a biometric sensor to be used in the primary user authentication 810.

Furthermore, in one embodiment, the context information (A) 820 that is only relevant to the unique characteristics of biometric information used for the primary user authentication 810 may be selected, but the irrelevant ones may not be selected. For example, when the primary user authentication 810 is face authentication, the illuminance information may be selected but the noise information may be excluded.

The security module 181 of the electronic device 100 sets a multidimensional first variable determination criterion 830 including the context information 820 to authenticate biometric information sensed through biometric sensors during the primary user authentication 810.

Here, the biometric information may be classified according to the type of biometric authentication. The biometric authentication includes face authentication, fingerprint authentication, voice authentication, iris authentication, vein authentication, blood vessel authentication, and the like, and exhibits a person's unique characteristics. Therefore, the biometric information includes face recognition information, fingerprint recognition information, voice recognition information, iris recognition information, vein recognition information, blood vessel recognition information, and the like. Therefore, biometric sensors for sensing the biometric information denote sensors capable of sensing the user's face recognition information, fingerprint recognition information, voice recognition information, iris recognition information, vein recognition information, blood vessel recognition information, and the like.

The security module 181 may perform multimodal biometric authentication using different biometric sensors according to the characteristic information of biometric information.

Here, the characteristic information of biometric information is information indicating the unique characteristic of biometric information. In addition, the unique characteristics may include quality information of biometric information, spoofing information/anti-spoofing information of biometric information, characteristics related to a method of collecting biometric information, and the like, as a whole.

For example, the quality information of face recognition information is a resolution of face recognition information. For example, the spoofing information/anti-spoofing information of face recognition information is information for allowing the face recognition information to recognize a face photo as an actual face, and the anti-spoofing information may be movement sensing, eye blink detection, reflectivity information of a 2D image, thermal image information, heart rate information, frequency spectrum information, audio and video synchronization information, and the like. In addition, for example, characteristic information related to a method of collecting face recognition information may include a characteristic of generating image capturing and a capturing sound for acquiring a face image, and a characteristic to be captured at a predetermined level or higher, and the like.

In addition, the first variable criterion may be determined in consideration of biometric sensors that sense biometric information, collected context information, a matching score between the biometric information and previously registered user information, and a fake score of the biometric information as a whole.

Here, the previously registered user information denotes the features of biometric information previously registered with the electronic device 100. For example, in the case of face authentication, a height of nose, a spacing between eyes, and a shape of eyebrow, which are the features of previously registered face recognition information, may be included therein as a whole. For example, in the case of vein authentication, a blood vessel/vein pattern of a user's palm, finger, hand, or the like may be a feature of previously registered vein recognition information.

The matching score is a value obtained by converting the similarities between the feature points of the previously registered user information and the biometric information detected by the biometric sensor into a score. A genuine user has a high matching score. However, a matching score for the same user may vary depending on various context information collected while sensing biometric information.

In addition, a fake relevance score of biometric information may include at least one of an anti-spoofing score and a quality score.

The spoofing score is a score obtained by converting a possibility that the biometric information is fake information. Therefore, the anti-spoofing score is a score obtained by converting a possibility that the biometric information is not fake information. If the spoofing score is a fake score associated with a false acceptance rate (FAR), then the anti-spoofing score may be referred to as a fake score associated with a false rejection rate (FRR).

The quality score is related to the detection of the characteristics of biometric information, and the quality of the detected biometric information is converted into a score.

For example, the security module 181 may convert a resolution of face recognition information and a signal-to-noise ratio of voice recognition information into a normalized quality score according to a preset criterion. In addition, the security module 181 may perform authentication using biometric information having a higher score based on the converted quality score. Here, various methods known in the related art may be used for the conversion criterion of the normalized quality score, and the detailed description thereof will be omitted here.

The security module 181 may generate a variable decision function based on the context information and the fake relevance score of biometric information. Here, the variable decision function may be generated differently each time biometric information is sensed by combining at least one of the anti-spoofing score and the quality score with the context information.

The decision function is a function that determines whether a user who enters biometric information is a genuine user or an impostor user. The decision function may be set to a specific threshold value, or may be set to a multi-dimensional function. For the decision function, the initial value may be changed as the use of the biometric authentication function of the electronic device 100 is accumulated, but the default value is set by the manufacturer.

However, in the present disclosure, a multidimensional function in which a threshold value or a threshold range of no decision is varied each time is set as an authentication determination criterion in consideration of various context information and a fake relevance score collected at the time of sensing biometric information. Therefore, a different decision function may be set for the same biometric information as well as for different biometric information.

Furthermore, the variable decision function is generated not only during the primary user authentication 810 but also during the secondary user authentication 880. It is the same not only in the case of serial multimodal biometric authentication as shown in FIG. 8A but also in the case of parallel multimodal biometric authentication in which the primary and secondary user authentications are simultaneously performed.

The generated variable decision function may be stored in the memory 170 for each type of biometric information. In addition, the stored variable decision function may be automatically updated upon recognition of the next biometric information.

In this manner, every time the biometric information is sensed, the variable decision function is determined to perform matching 840. During the matching 840, a matching score is calculated by comparing biometric information used for the primary user authentication 810 with previously registered user information. In addition, a final score may be calculated by combining the biometric fake relevance score (e.g., anti-spoofing score, quality score, etc.) of biometric information with the calculated matching score. Then, the variable decision function generated based on the context information and the fake relevance score of biometric information is applied to the calculated final matching score to perform authentication.

According to this, the sensing accuracy of the primary user authentication 810 is increased and the usability of the multimodal biometric authentication through the secondary user authentication 880 is also further improved.

As a result of performing the matching 840 of the primary user authentication by applying the variable decision function, any one of an authentication success 850, an authentication failure 860, and no decision 870 is displayed as the authentication result.

The authentication result may be immediately displayed on the display unit 151 of the electronic device 100. Alternatively, the authentication result may be displayed as a final authentication result obtained by fusing a plurality of authentication results after both the primary user authentication 810 and the secondary user authentication 880 are completed.

In the present disclosure, if the authentication result of the primary user authentication 810 is the authentication success 850 or the authentication failure 860, the secondary user authentication 880 may not be performed. In other words, when the authentication result of the primary user authentication 810 is no decision 870, the secondary user authentication 880 may be carried out subsequently.

In the present disclosure, since the primary user authentication is performed by applying a variable decision function generated by including the context information and the fake relevance information, the secondary user authentication 880 is not carried out due to the authentication failure 860 of a genuine user, thereby solving a problem that the usability of multimodal biometric authentication is lowered. In addition, a problem that the accuracy of sensing is lowered since the secondary user authentication 880 is not performed due to the authentication success 850 of an impostor user is also solved.

Even during the secondary user authentication 880, a multidimensional second variable determination criterion is set 830' by including the context information (B) 820' collected while sensing biometric information. The setting of the second variable determination criterion is similar to the setting of the first variable determination criterion.

However, the context information (A) at the time of performing the primary user authentication 810 is different from the context information (B) at the time of performing the secondary user authentication 880, and the respective fake relevance scores (e.g., anti-spoofing score, quality score) are different, and thus a variable decision function in the primary user authentication 810 and a variable decision function in the secondary user authentication 880 are different from each other.

During the matching 840' of the secondary user authentication 880, a second variable criterion 830' is applied to the final score. Accordingly, an authentication success 850' or an authentication failure 860' is displayed. At this time, a final authentication result fused with a result of the primary user authentication and a result of the secondary user authentication may be displayed.

When the first and/or second user authentication result is displayed by the security module 181, an operation related to the authentication result of the controller 180 of the electronic device 100 may be controlled.

FIG. 8B illustrates a process of performing primary user authentication in more detail, and FIG. 8C illustrates a process of performing secondary user authentication in more detail.

Referring to FIG. 8B, an anti-scooping score 811, a quality score 812, and a matching score 813 are calculated based on the first biometric information sensed through the sensor (A). In addition, a variable determination criterion is set 815 in consideration of the anti-scooping score (SA), the quality score (QA) and the matching score (MA) related to the characteristics of the first biometric information as a whole, by including context information (CA) 814 collected at the time of sensing the first biometric information. Furthermore, matching & decision 816 is then carried out to apply the set variable determination criterion to the final score.

Then, referring to FIG. 8C, an anti-scooping score 821, a quality score 822, and a matching score 823 are calculated based on the second biometric information sensed through the sensor (B). At this time, factors of variable determination criteria (SA, QA, MA, CA) 815' set in the primary user authentication may be included as additional factors in the setting 815'. In other words, the fusion 825 of the variable determination criteria may be carried out. Then, matching & decision 826 that applies the fusion 825 of variable determination criteria to a final score related to second biometric information is carried out.

Hereinafter, an authentication result according to a determination criterion in the related art and an authentication result according to the application of a variable determination criterion according to the present disclosure will be described in comparison with each other with reference to FIGS. 9A through 9C.

Figure 9A:
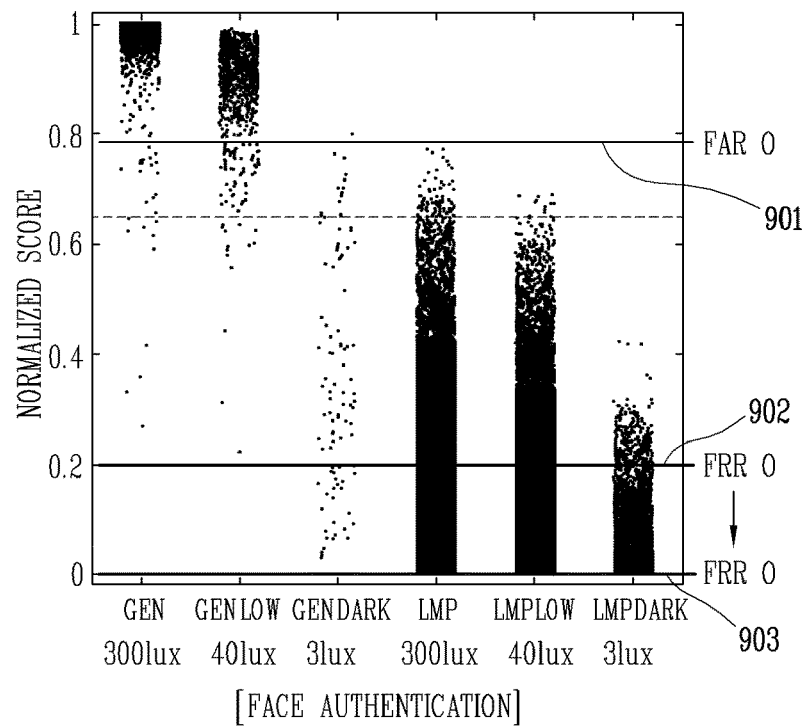
FIGS. 9A through 9C are exemplary graphs for comparing an authentication result according to a determination criterion in the related art with an authentication result according to a variable determination criterion according to the present disclosure during multimodal biometric authentication according to the present disclosure.

FIG. 9A is an example of performing matching & decision according to a fixed decision criterion in the related art when performing face authentication. A reference value/baseline (hereinafter referred to as an "upper threshold value" 901) at which the false acceptance rate (FAR) becomes zero is fixed to a normalized final score of 0.8. Furthermore, a reference value/baseline (hereinafter referred to as a "lower threshold value" 902) at which the false rejection rate (FRR) becomes zero is fixed to a normalized final score of 0.2.

When the final score of face authentication is equal to or greater than (or above) the upper threshold value 901, it becomes an authentication success, and when the final score of face authentication is less than (or below) the lower threshold value 902, it becomes an authentication failure. In addition, when it is between the upper threshold value 901 and the lower threshold value 902, it becomes no decision.

However, depending on the context, it is required to increase or decrease the upper threshold value 901 and/or the lower threshold value 902. For example, when the ambient illumination is dark, for example, 3 lux, a genuine user also fails authentication. In this case, when a reduced lower threshold value 903 is applied to obtain an authentication result which is no decision other than an authentication failure, most of the impostor will have no decision other than an authentication failure in the 3 lux environment, thereby greatly reducing the sensing accuracy and the usability of primary user authentication.

Figure 9B:
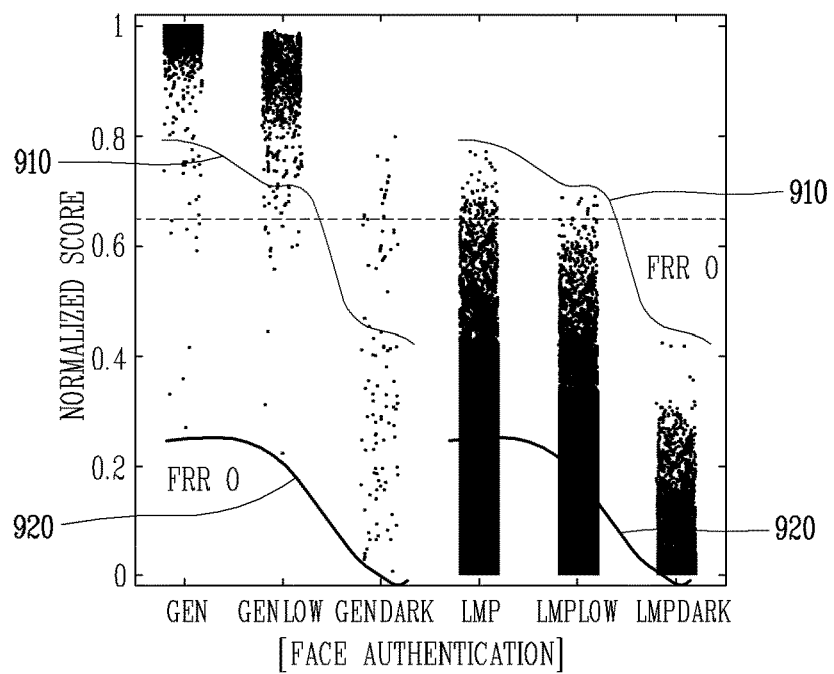

However, in the present disclosure, as illustrated in FIG. 9B, a variable upper threshold value 910 and a variable lower threshold value 920 are applied according to the level of ambient illuminance (e.g., Gen, GenLow, BenDark). Here, the upper and lower threshold values may be defined as a continuous value in a multidimensional function that varies according to the level of the context information, other than a specific value.

Thus, even if the scores are the same, it becomes no decision when the ambient illuminance is dark, for example, at 3 lux, and it becomes an authentication failure or an authentication success when the ambient illuminance is bright, and thus the accuracy of sensing improves. Moreover, when the ambient illuminance is dark, for example, 3 lux, it becomes no decision and secondary user authentication is carried out, and thus the usability of multimodal biometric authentication with higher security is further improved.

Figure 9C:
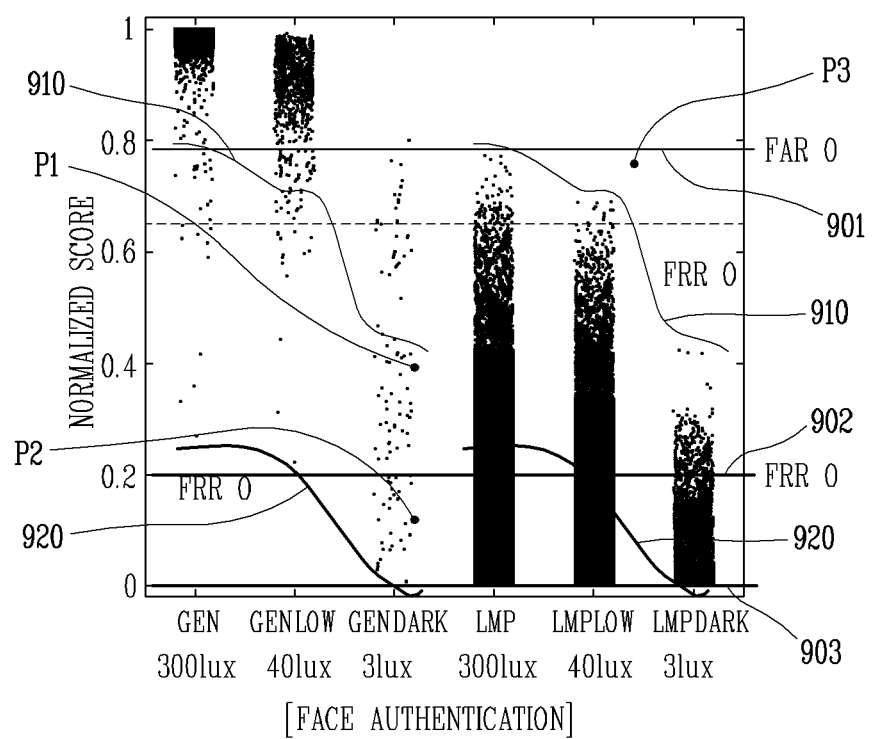

Referring to FIG. 9C, with respect to the matching & decision of the final score, at the first point (P1), it has the same result, that is, no decision, in both in a method of the related art and in a method according to the present disclosure. However, at the second point (P2), since a variable determination criterion is applied to the ambient illuminance by reflecting dark environment information, it becomes no decision in the present disclosure. However, in the method of the related art, it becomes an authentication failure at the second point (P2).

Furthermore, in the case where the ambient illuminance is normal at the third point (P3), a variable decision function in consideration of other factors than the illuminance information, for example, quality scores such as resolution, flow, distortion, and the like, and anti-spoofing scores such as 2D image reflectivity information, thermal image information, and the like as a whole is applied. Accordingly, it is determined as an authentication success in the present disclosure, whereas it becomes no decision according to a fixed determination criterion in the related art. In the case where the result of the secondary user authentication is fused to output the final authentication result even though the primary user authentication is an authentication success, the determination of the authentication success at the third point (P3) contributes to enhance the sensing accuracy.

As described above, according to the present disclosure, a variable decision function is generated as a multidimensional function in which an upper threshold value, a lower limit threshold value related to the determination of user authentication is varied according to a level of the context information, and/or a fake relevance score of biometric information (e.g., quality score, spoofing/anti-spoofing score), and applied to the final score.

Here, the upper threshold value is a value or a line at which the false acceptance rate (FAR) becomes zero, and the lower threshold value is a value or a line at which the false rejection rate (FRR) becomes zero. In addition, at least one of the upper threshold value or the lower threshold value is increased or decreased according to factors such as a level of the context information, and/or a fake relevance score of the biometric information.

On the other hand, when the environment information is acceleration information or noise information, a variable decision function in a similar form to the graph shown in FIG. 9B, that is, a variable upper/lower threshold value, may be generated. However, when the environment information is related to vein recognition information or related to iris recognition information, a variable decision function in an opposite form to the graph shown in FIG. 9B, that is, a variable upper/lower threshold value, may be generated.

Figure 10:
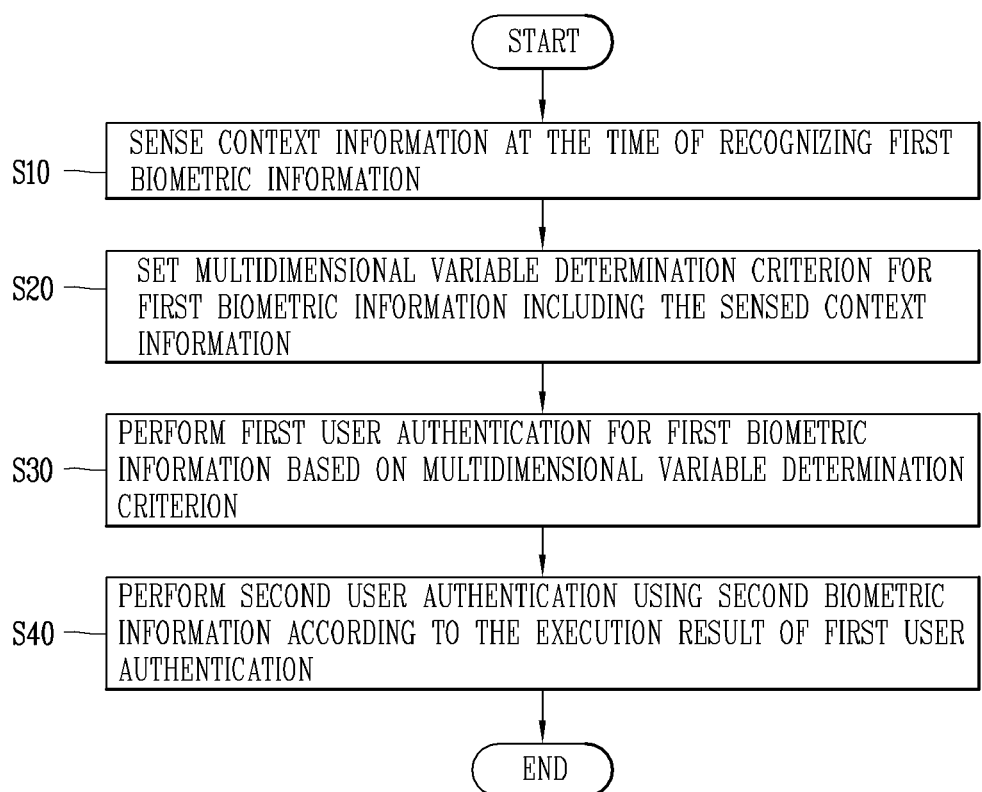
FIG. 10 is a flowchart for explaining a method of applying a variable determination criterion according to a context to perform serial biometric authentication during multimodal biometric authentication according to the present disclosure.

FIG. 10 is a flowchart of a process of applying a variable determination criterion according to a context to perform serial biometric authentication during multimodal biometric authentication according to the present disclosure.

When a biometric authentication function is activated, the electronic device 100 according to the present disclosure may sense first biometric information through a first biometric sensor, and sense context information at the time of sensing/recognizing the first biometric information (S10). Next, a multidimensional variable determination criterion for the first biometric information is set by including the sensed context information (S20). Then, first user authentication for the first biometric information is carried out based on the set multidimensional variable determination criterion (S30). Then, second user authentication using second biometric information is carried out according to the execution result of the first user authentication (S40).

FIGS. 11A through 14 are examples showing specific multimodal biometric authentication elements and context information to which a variable determination criterion according to the present disclosure is applied.

According to an embodiment of the present disclosure, the second user authentication is carried out when the authentication result of the first user authentication is no decision that does not correspond to both an authentication success and an authentication failure.

Moreover, in one embodiment, the second user authentication may combine a comparison result obtained by comparing previously registered user information and first biometric information performed at the time of first user authentication and a comparison result obtained by comparing second biometric information and previously registered user information to perform final user authentication.

Figure 11A:
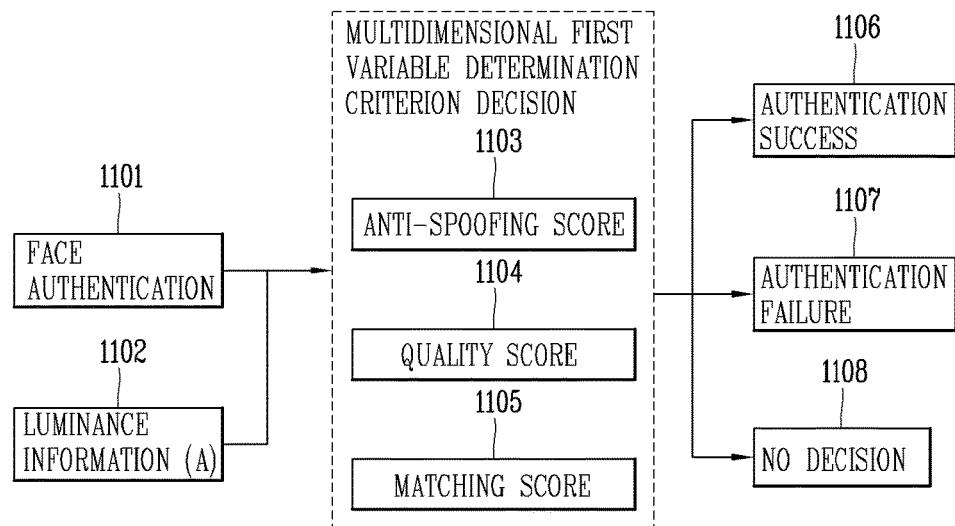
FIGS. 11A through 14 are different examples showing specific multimodal biometric authentication elements and context information to which a variable determination criterion is applied during multimodal biometric authentication according to the present disclosure.

First, in FIG. 11A, face authentication 1101 is used as the first user authentication, and illuminance information (A) 1102 is selected as the context information. Furthermore, a multidimensional first variable determination criterion 1104 is determined in consideration of an anti-spoofing score 1103, a quality score 1104 and a matching score 1105 related to face recognition information, including the collected illuminance information (A). In addition, applying the first variable determination criterion to the final score results in any one result of an authentication success 1106, an authentication failure 1107, and no decision 1108.

Figure 11B:
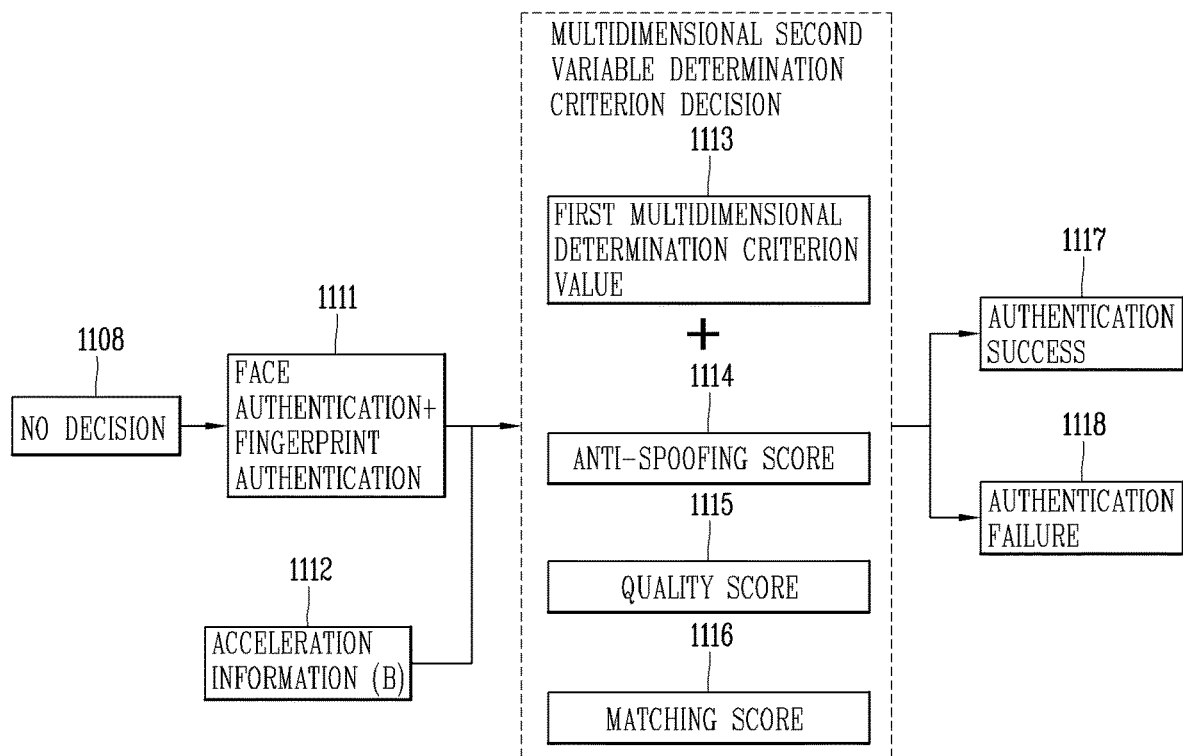

Referring to FIG. 11B, when the authentication result of the face authentication 1101 is no decision 1108 in FIG. 11A, second user authentication 1111 fused with face authentication and fingerprint authentication is carried out. At this time, acceleration information (B) 1112 may be selected as the context information. At this time, the acceleration information (B) 1112 may be different from acceleration information collected at the time of the face authentication 1101. Next, a multidimensional second variable determination criterion is determined by further considering an anti-spoofing score 1114 related fingerprint recognition information, a quality score 1115, a matching score 1116, and a first variable determination criterion value 1113 determined during the face authentication, including the acceleration information (B) 1112.

In addition, applying the second variable determination criterion to the final score results in either one result of an authentication success 1117 and an authentication failure 1116.

Figure 12:
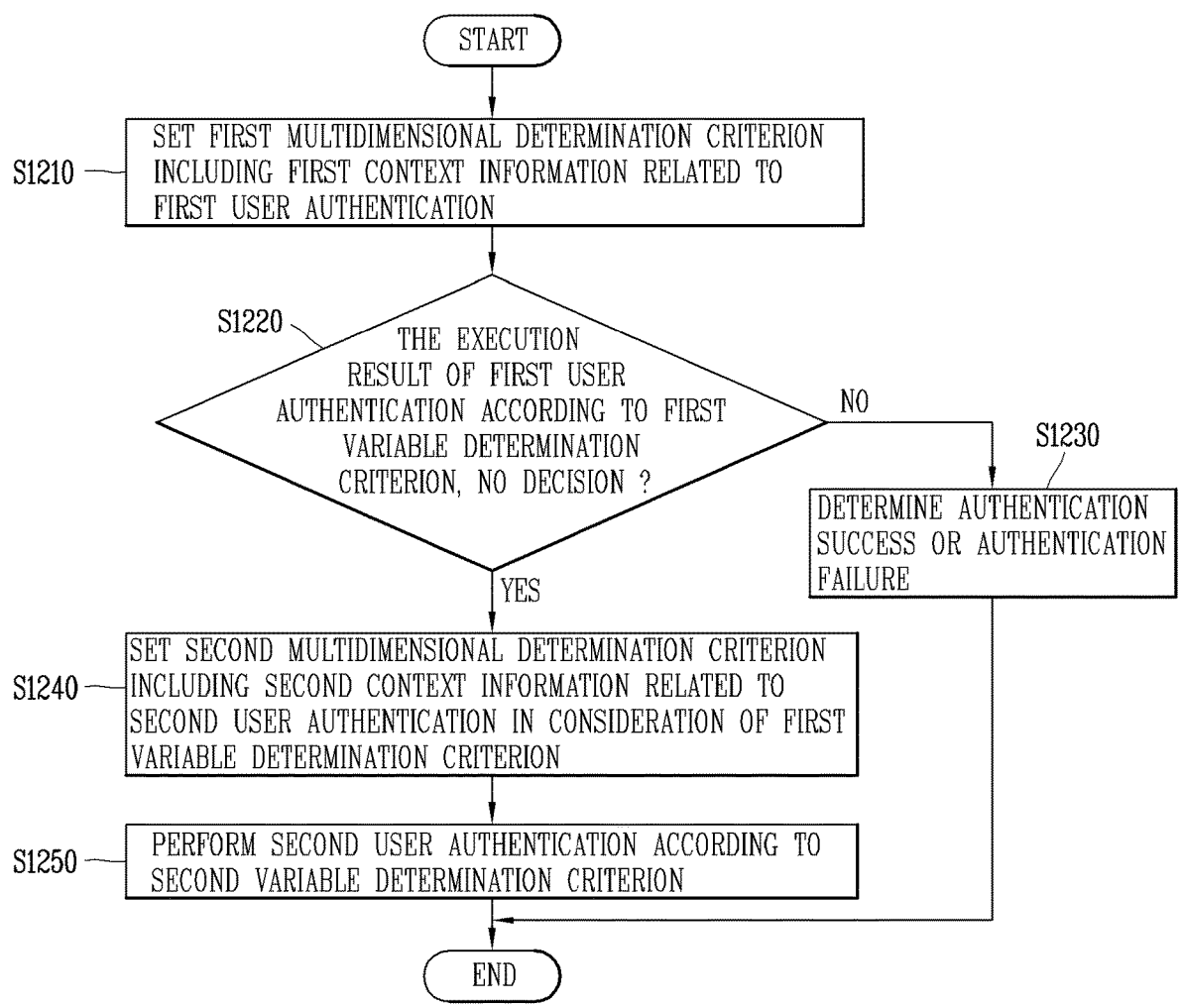

FIG. 12 is a flowchart showing a method of determining a variable determination criterion for multimodal biometric authentication with reference to FIGS. 11A and 11B.

When multimodal biometric authentication function according to the present disclosure is activated, a first variable criterion is set by including first context information related to the first user authentication as shown in FIG. 12 (S1210). Then, it is determined whether the result of the first user authentication is no decision according to the set first variable determination criterion (S1220). When it is a section other than no decision, it is determined as an authentication success or an authentication failure (S1230).

Here, the no decision is a case where a final score in consideration of a matching score related to the first user authentication, a fake relevance score of the biometric information of the first user authentication, and the context information as a whole is less than the foregoing lower threshold value. In the present disclosure, the lower threshold value varies according to the context information and/or the fake relevance score When the result of the first user authentication is no decision, a second variable determination criterion including second context information related to the second user authentication is set in consideration of the first variable determination criterion (S1240). Then, the second user authentication is carried out based according to the set second variable determination criterion (S1250).

Meanwhile, in one embodiment, both the first and second biometric information may be used while performing the second user authentication. Furthermore, a multidimensional variable determination criterion during the second user authentication may be determined by further considering a multidimensional variable determination criterion used for the first user authentication.

Figure 13:
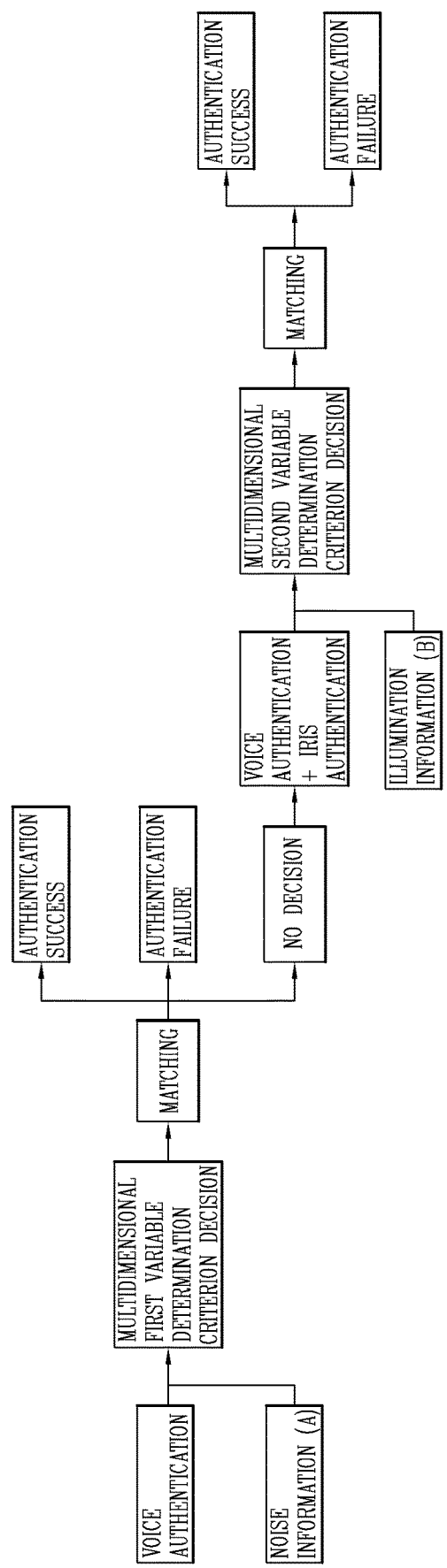

FIG. 13 shows a process of performing serial multimodal biometric authentication according to the present disclosure using voice authentication and iris authentication as multimodal biometric authentication. During the first user authentication, a multidimensional variable determination criterion including noise information (A) is set. When the result of voice authentication is no decision, voice authentication and iris authentication are fused, and a multidimensional variable determination criterion including illuminance information (B) is set again.

Figure 14:
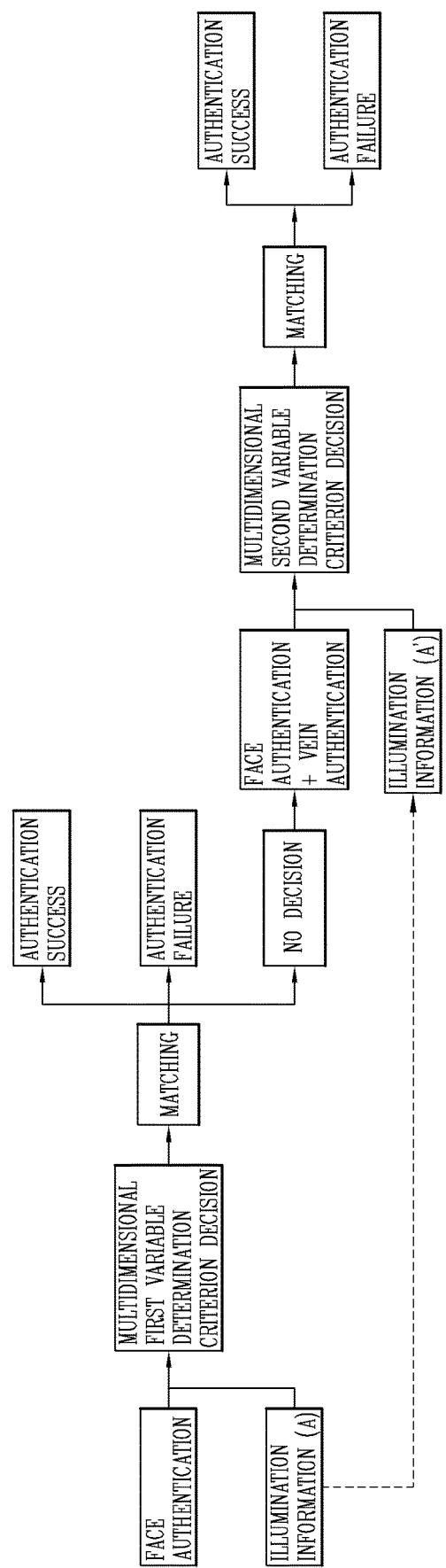

FIG. 14 shows a process of performing serial multimodal biometric authentication according to the present disclosure using face authentication and vein authentication as multimodal biometric authentication. During the first user authentication, a multidimensional variable determination criterion including illuminance information (A) is set. When the result of face authentication is no decision, face authentication and vein authentication are fused, and a multidimensional variable determination criterion including illuminance information (A') is set again.

Furthermore, in one embodiment, biometric information and context information for the second user authentication may be selected based on the biometric information and context information used for the first user authentication when performing the second user authentication. For example, when the illuminance information (A) collected in the face authentication is dark, it is seen that vein authentication that can be authenticated in a dark environment is selected, and the illuminance information, which is context information related thereto, is selected again.

However, the illuminance information (A') collected during vein authentication differs from the illuminance information (A) collected during face authentication, and acts as a different factor when setting a variable determination criterion. For example, during the face authentication, as a level of the illuminance information (A') increases, a variable decision function similar to that of FIG. 9B is generated. On the contrary since the vein authentication uses infrared rays to project the user's blood vessel, a variable decision function in an opposite form to that of FIG. 9B will be generated as the level of the illuminance information (A') increases.

Figure 15:
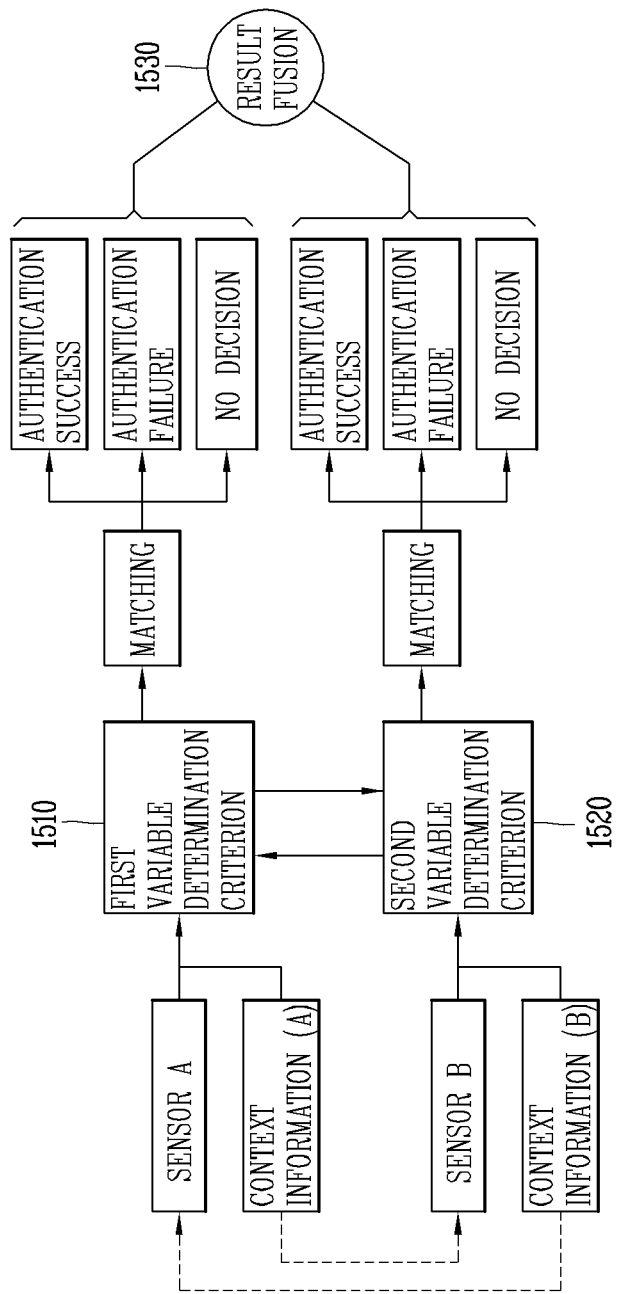
FIG. 15 is a conceptual view illustrating a method of applying a variable determination criterion according to a context and fusing a plurality of sensors, context information, and the variable determination criterion to perform parallel biometric authentication during multimodal biometric authentication according to the present disclosure.

FIG. 15 is a conceptual view illustrating a method of applying a variable determination criterion according to a context and fusing a plurality of sensors, context information, and the variable determination criterion to perform parallel biometric authentication during multimodal biometric authentication according to the present disclosure.

FIG. 15 is an example of applying a variable determination criterion according to the present disclosure to perform authentication during parallel multimodal biometric authentication in which first user authentication using the sensor (A) and second user authentication using the sensor (B) are carried out at the same time.

In FIG. 15, first biometric information and second biometric information may be sensed at the same time by the sensor (A) and the sensor (B). At this time, at the time of calculating the matching score of the first biometric information, the fused context information, that is, both the context information (A) and the context information (B), may be taken into consideration. Furthermore, at the time of calculating the matching score of the second biometric information, the fused context information, that is, both the context information (A) and the context information (B), may be taken into consideration.

In addition, a first variable determination criterion 1510 applied to the final score of the first biometric information may also be applicable to the final score of the second biometric information. Furthermore, a second variable determination criterion 1520 applied to the final score of the second biometric information may also be applicable to the final score of the first biometric information. Alternatively, a third variable determination criterion fused with the first and second variable criteria may also be applicable to the final score of the first biometric information and the final score of the second biometric information, respectively.

Moreover, the authentication result of the first biometric information and the authentication result of the second biometric information are fused 1530 to calculate the final authentication result.

As described above, an electronic device according to the present disclosure may determine a variable determination criterion in consideration of a fake relevance score related to a surrounding environment at the time of performing biometric authentication and the characteristics of biometric authentication to perform biometric authentication, thereby improving all the usability, convenience and sensing accuracy of biometric authentication. In addition, whether or not to perform secondary authentication may be determined according to the execution result of primary authentication, thereby improving the authentication speed of biometric authentication. Furthermore, a multidimensional function in which a threshold value or a threshold range of no decision is varied each time may be applied to authentication in consideration of various context information collected while sensing biometric information and a fake relevance score as a whole, thereby improving the accuracy of biometric authentication during secondary authentication.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. An electronic device for performing multimodal biometric authentication, the electronic device comprising:
   a first biometric sensor configured to sense first biometric information;
   a second biometric sensor configured to sense second biometric information;
   a security module configured to set a multidimensional variable determination criterion including context information at the time of sensing at least one of the first biometric information and the second biometric information, perform first user authentication by applying the multidimensional variable determination criterion to a matching score for the first biometric information or the second biometric information, and determine whether or not to perform second user authentication using remaining biometric information based on a result of the first user authentication; and
   a controller configured to control an operation of the electronic device based on at least one of results of the first and second user authentications carried out by the security module,
   wherein the security module is further configured to perform user authentication by applying a variable decision function generated based on the context information and a fake relevance score of biometric information to a calculated matching score, and
   wherein the variable decision function is generated in which an upper threshold value and a lower threshold value related to a user authentication determination vary according to a level of the context information, and
   wherein when the second user authentication is performed as the authentication result of the first user authentication does not correspond to both an authentication success and an authentication failure, both the first biometric information and the second biometric information are used.

2. The electronic device of claim 1, wherein the multidimensional variable determination criterion is determined in consideration of biometric sensors for sensing the biometric information, the context information, the matching score, and the fake relevance score of the biometric information.

3. The electronic device of claim 1, wherein the context information comprises at least one of ambient illuminance, ambient noise, ambient temperature, characteristic information of biometric information, movement information, a posture of the electronic device, an execution of a preset application, a battery remaining amount of the electronic device, and an input sequence of biometric information, and
   at least one of the context information is selected based on characteristics of the biometric information.

4. The electronic device of claim 3, wherein the security module calculates the matching score by comparing the first biometric information or the second biometric information with previously registered user information, calculates a final score by combining the calculated matching score with the fake relevance score of the biometric information, and performs the user authentication.

5. The electronic device of claim 4, wherein the fake relevance score of the biometric information comprises at least one of an anti-spoofing score and a quality score, and
   the variable decision function is generated by combining at least one of the anti-spoofing score and the quality score with the context information.

6. The electronic device of claim 4, wherein the upper threshold value is a value at which a false acceptance rate (FAR) becomes zero, and the lower threshold value is a value at which a false rejection rate (FRR) becomes zero, and
   wherein at least one of the upper threshold value and the lower threshold value is increased or decreased according to the level of the context information.

7. The electronic device of claim 4, wherein the second user authentication is carried out when the authentication result of the first user authentication does not correspond to both an authentication success and an authentication failure.

8. The electronic device of claim 7, wherein no decision is a case where the final score in consideration of the matching score, the fake relevance score of the biometric information, and the context information is less than the lower threshold value, and the lower threshold value is varied according to the context information.

9. The electronic device of claim 1, wherein when the second user authentication is determined to be performed, biometric information and context information for the second user authentication are selected based on biometric information and context information used for the first user authentication.

10. The electronic device of claim 1, wherein
    a multidimensional variable determination criterion during the second user authentication is determined by further considering a multidimensional variable determination criterion used for the first user authentication.

11. The electronic device of claim 10, wherein when the second user authentication is performed as the authentication result of the first user authentication does not correspond to both the authentication success and the authentication failure, the multidimensional variable determination criterion during the second user authentication is determined by further considering both the multidimensional variable determination criterion used for the first user authentication and context information used for the first user authentication.

12. A method of operating an electronic device that performs multimodal biometric authentication, the method comprising:
    sensing biometric information of at least one of a first biometric sensor and a second biometric sensor;
    setting a multidimensional variable determination criterion including context information at the time of sensing at least one of the biometric information of the first and second biometric sensors;
    performing first user authentication by applying the multidimensional variable determination criterion to a matching score for the at least one biometric information;
    determining whether or not to perform second user authentication using remaining biometric information based on a result of the first user authentication; controlling an operation of the electronic device based on at least one of results of the first and second user authentications; and
    performing user authentication by applying a variable decision function generated based on the context information and a fake relevance score of biometric information to a calculated matching score, wherein the variable decision function is generated in which an upper threshold value and a lower threshold value related to a user authentication determination vary according to a level of the context information, and wherein when the second user authentication is performed as the authentication result of the first user authentication does not correspond to both an authentication success and an authentication failure, both first biometric information and second biometric information are used.

13. The method of claim 12, wherein the setting the multidimensional variable determination criterion sets in consideration of biometric sensors for sensing the biometric information, the context information, the matching score, and the fake relevance score of the biometric information.

14. The method of claim 13, wherein the performing the first user authentication comprises:
- calculating the matching score by comparing the first biometric information or the second biometric information with previously registered user information;
- calculating a final score by combining the calculated matching score with the fake relevance score of the biometric information; and
- performing the first user authentication.

15. The method of claim 14, wherein the second user authentication is carried out when the final score is a value between an upper threshold value and a lower threshold value as a result of performing the first user authentication.

* * * * *